Oct. 16, 1962 W. F. MARANTETTE ETAL 3,059,236
CONTROL SYSTEM
Filed Sept. 23, 1957 4 Sheets-Sheet 1
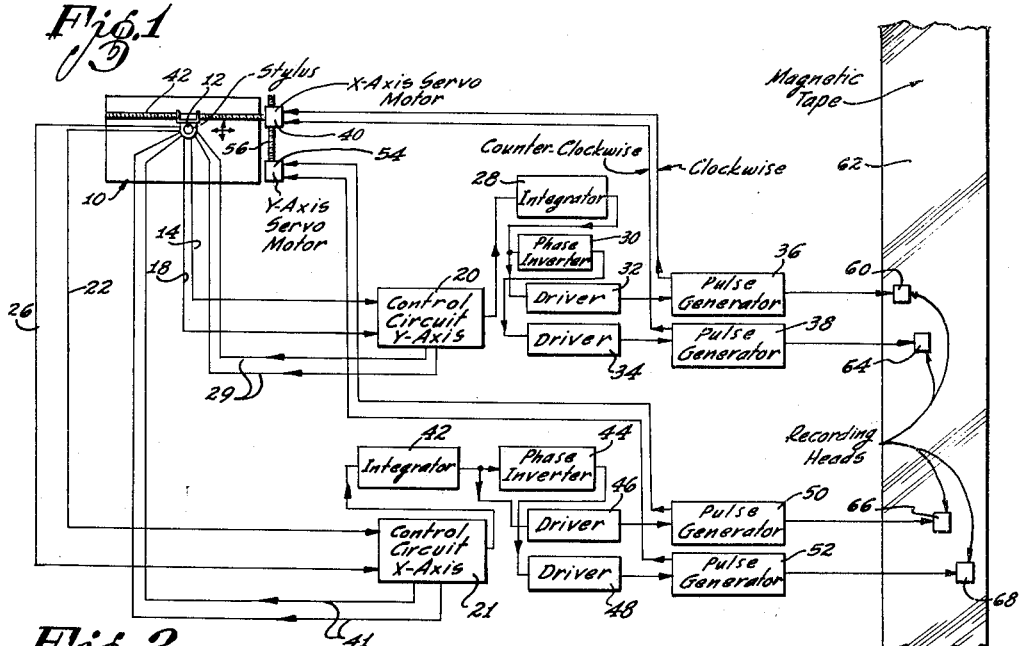
Fig. 1
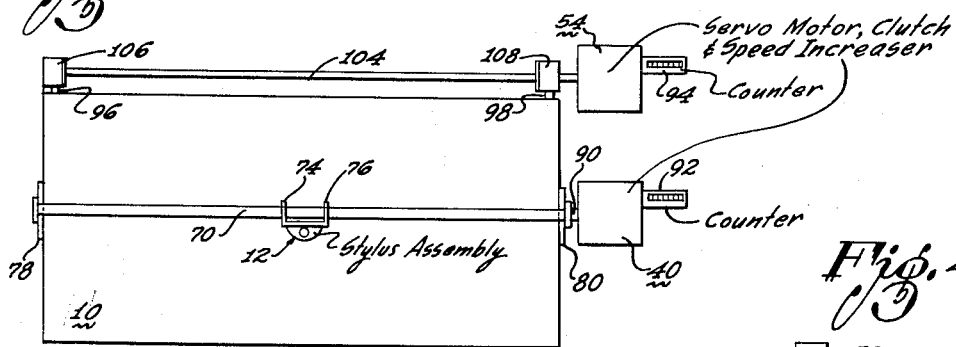
Fig. 2
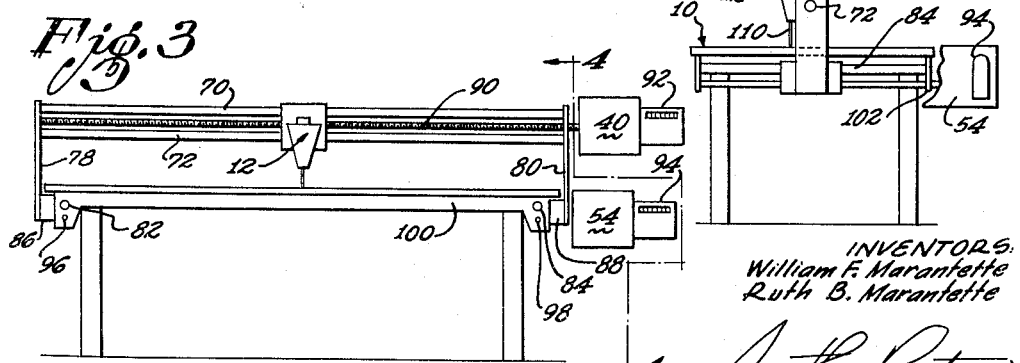
Fig. 3
Fig. 4
INVENTORS.
William F. Marantette
Ruth B. Marantette
Smyth & Roston
Attorneys.

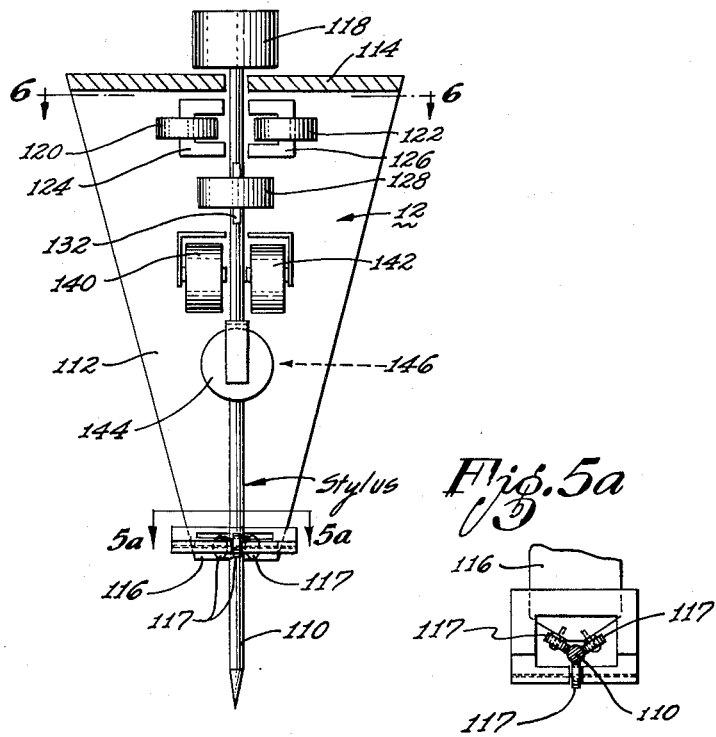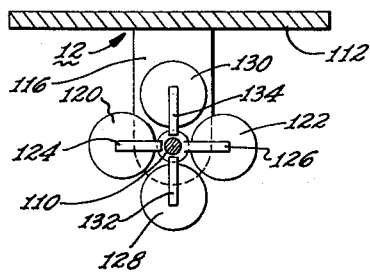

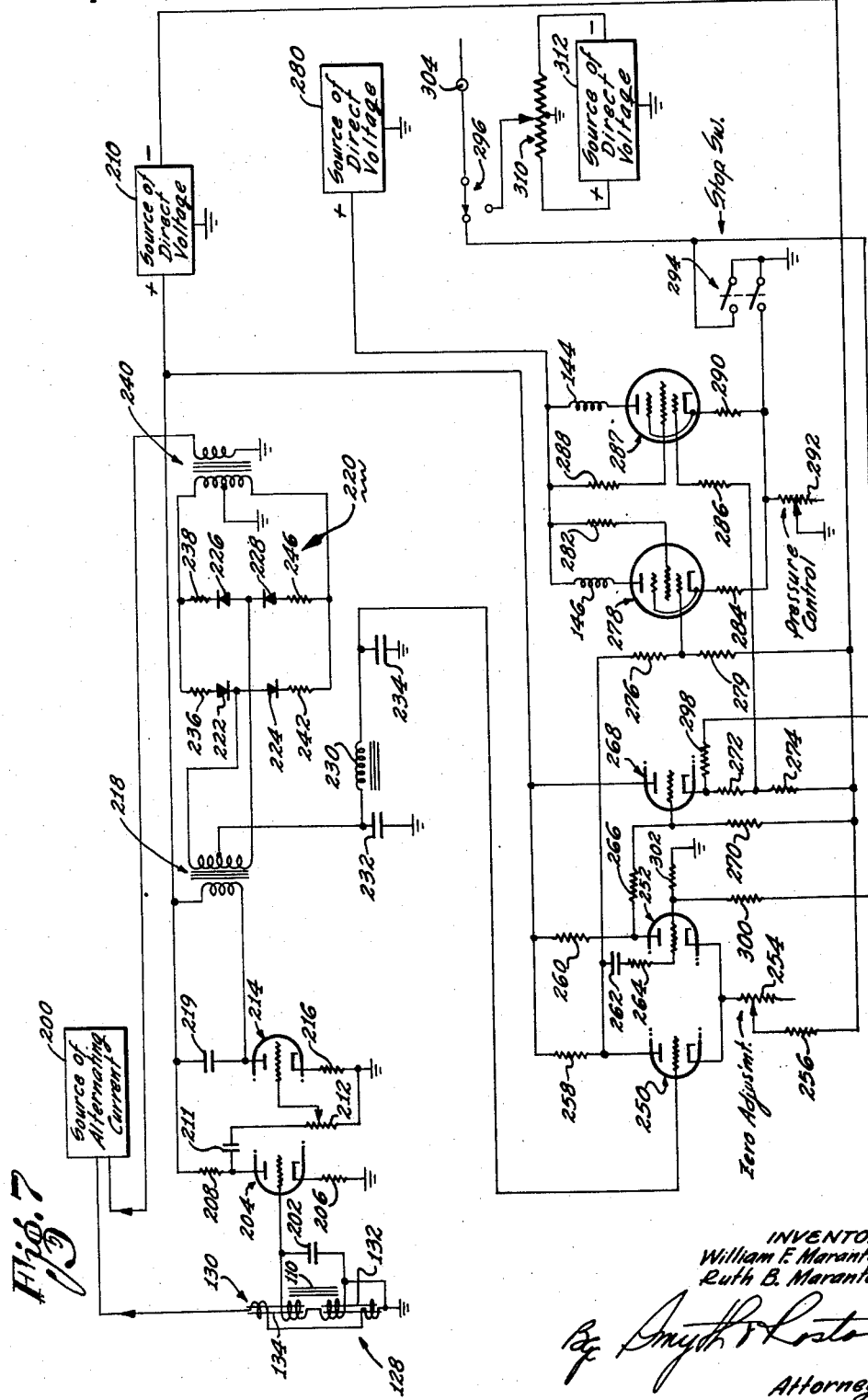

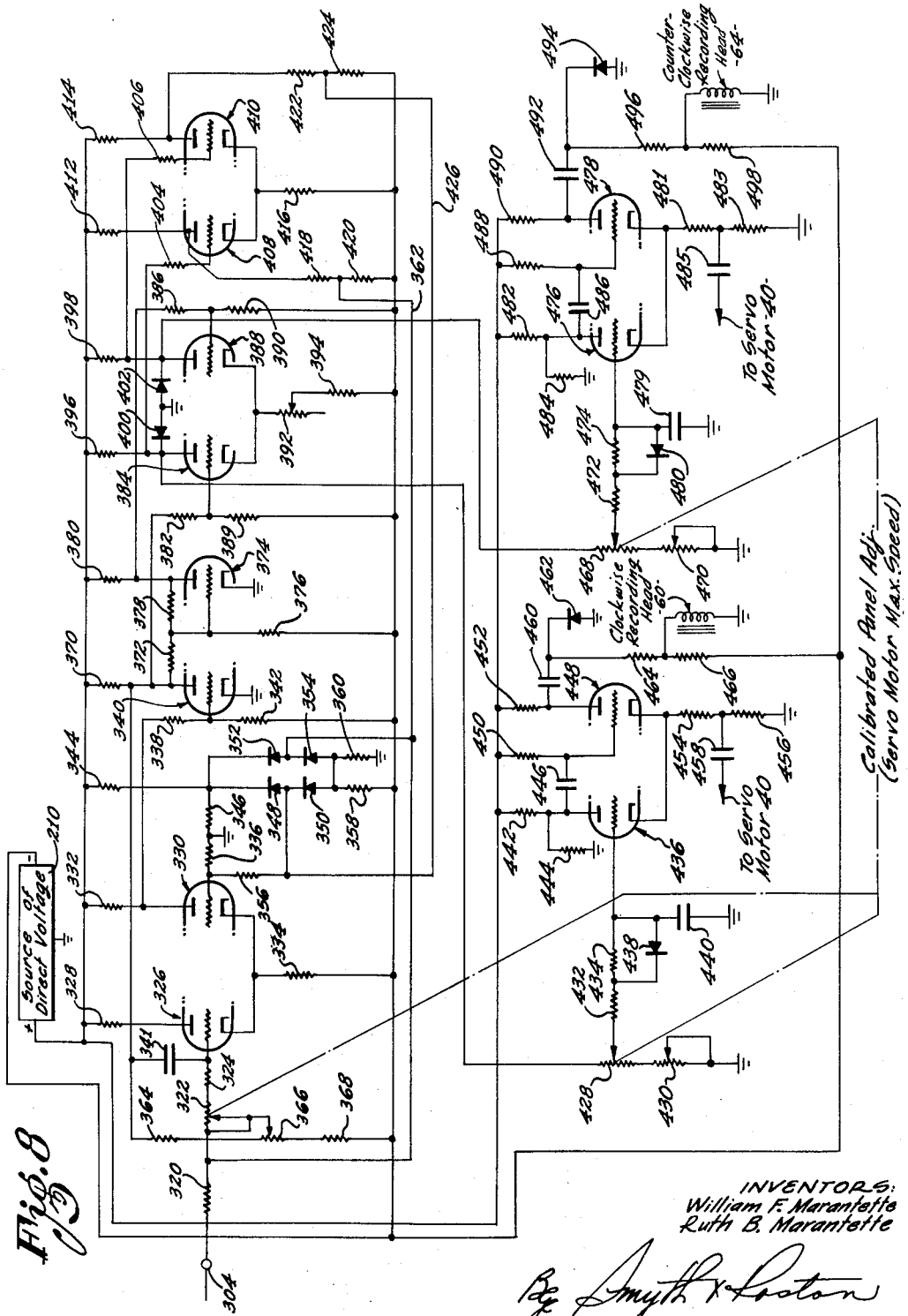

3,059,236
CONTROL SYSTEM
William F. Marantette and Ruth B. Marantette, Manhattan Beach, Calif., assignors, by mesne assignments, to The Akron Standard Mold Company, Akron, Ohio, a corporation of Ohio
Filed Sept. 23, 1957, Ser. No. 685,503
13 Claims. (Cl. 346—8)

The present invention relates to systems and apparatus for recording data in digital form on a recording medium, such as magnetic tape, the recorded data representing movements of one or more servo or other mechanisms.

The invention is more particularly directed to an improved and unique system and apparatus for recording digital data corresponding to a graphic lay-out or representation, such digital data being recorded in response to the manually controlled movements of a stylus or similar member with respect to such graphic representation.

The recorded data of the present invention finds perhaps its greatest utility in the control of machine tools and the like. However, it will become evident as the present description proceeds that the recorded data may conveniently be used for other related control fields and for other unrelated uses.

Generally the automatic control of machine tools requires that the cutting component of the tool be capable of automatic cycling and that the workpiece be capable of automatic controlled movement. Automatic cycling for many types of machine tools is a technique that is well established in the present state of the art. Moreover, copending application Serial No. 685,504, filed September 23, 1957, now Patent No. 2,941,136, issued January 14, 1960, by us, discloses and claims an automatically controlled work table which can be used in conjunction with many types of machine tools to control the movement of successive workpieces. The motion of the work table, as described in the copending application, may be controlled along two perpendicular axes in, for example, a horizontal plane, and this control may be in accordance with data recorded on a magnetic tape or other recording medium. The controlled work table is adapted to repeat a series of operation for successive workpieces, so that a plurality of workpieces having identical configurations may be cut.

One embodiment of the particular system of the copending application uses, for example, a magnetic tape on which a plurality of separate channels of information are recorded. Four of these channels may be used to produce the required motion of the work table.

The present invention is directed to a suitable system and apparatus for recording data in, for example, four channels of a magnetic tape or other recording medium, which data is suitable to control the work table of the copending application as described in the preceding paragraphs. Moreover, and as noted above, it will become apparent as the present description proceeds that the recorded data may be put to a multiplicity of other uses.

In one embodiment of the apparatus and system of the invention, a recording table is used and a graphic lay-out of the path of contemplated machine tool movement with respect to each work piece is drafted on the table in full size or in a multiple of full size. A servo-controlled stylus assembly is positioned over the recording table. The system is such that the stylus assembly is driven by a servo system along the graphic representation in response to a suitable control such as a manual control. Control voltages representing the corresponding clockwise and counterclockwise revolutions of a coordinate axis servomotor are developed in the system as the stylus assembly is driven across the lay-out in the co-ordinate direction in response to the manual control. In like manner, control voltages representing the corresponding clockwise and counterclockwise revolutions of an ordinate axis servomotor are developed in the system as the stylus assembly is driven across the lay-out in the ordinate direction in response to the manual control.

The control voltages derived from the operation of the manual control are used to control respective ones of a plurality of pulse generators. A first pair of these pulse generators produces trains of pulses corresponding respectively to clockwise and counterclockwise rotations of one of the servomotors. A second pair of pulse generators generates pulses corresponding respectively to clockwise and counterclockwise rotations of the other servomotor. One set of pulses from the pulse generators excites a corresponding plurality of recording heads to produce recordings on a magnetic tape in a separate channel for each generator. Another set of pulses from the generators drives the servomotors.

An advantage of the recording system of the invention is that when the recording is completed, it can be played back to cause the stylus assembly to repeat all of the movements that the operator made over the lay-out during the recording operation. This serves as an accurate and convenient check on the accuracy of the recording.

When the tape is played back, in the manner mentioned in the preceding paragraph, a servo system including the servomotors will reproduce the exact rotational movement which was produced when the operator was tracing the lay-out. However, when the control is exerted on the work table of a machine tool, or similar mechanism, the tape speed can be increased. This enables the machine tool to perform operations on each workpiece at a much faster rate than the operator is capable of performing in order to accurately trace the original lay-out. This constitutes an important feature of the present invention.

Another feature of the invention is that the system enables the gear ratios of the servomotors to be changed by the engagement and disengagement of speed increasing means included in the servomotors. This enables the lay-out itself to be some multiple, such as double, the actual control that is to be exerted on the work table or the like. This "blow-up" effect minimizes human tracing errors and results in greater recording accuracy.

In addition, each servomotor may be provided with a counter to show the true servo position at any particular time. Suitable clutches may then be provided to enable the stylus to be positioned manually on a new lay-out segment without disturbing the servo system. This feature is most important when the "blown-up" lay-out is larger than the table top and must be drawn in sections.

Instead of recording the data by the manual control of the stylus over a lay-out on a recording table, as described above, the stylus can be controlled in a manner to be described by the manual manipulation of a pair of potentiometers. For machine tools requiring only straight-line movements, this latter method can be used without the requirement of a separate recording table. That is, the potentiometers can be used to control the work table of the machine directly and cause the machine tool to perform a series of operations on a particular workpiece. While these operations are being carried out, the necessary data for repeating them may be recorded on the recording medium. For subsequent workpieces the recorded data is used to control the work table automatically so that the identical operations may be repeated for each such workpiece.

The recording system of the invention can also be used to record third dimensions. This can be achieved by the use of an additional servo system for following the stylus assembly as it is moved up from the horizontal plane of the recording table. In addition, angled planes can be accommodated by the provision of still further servo systems.

The apparatus of the invention is advantageous in that it is relatively straightforward and simple in its construction and, for those reasons, it is economical to produce as compared with prior art apparatus of this general type. Moreover, the apparatus of the invention is simple to operate and yet is extremely reliable and accurate.

The apparatus of one embodiment of the invention is constructed, for example, to include a stylus assembly in which the manual pivotal control of a stylus causes the assembly to be driven by a servo system over the top of the recording table. The assembly is constructed to include magnetic coils which oppose such pivotal motion of the stylus and assist in a manner to be described, to cause the speed by which the stylus assembly is driven by the servo system to be essentially proportional to the manual pivotal pressure exerted on the stylus. This enables the stylus assembly to be conveniently controlled, quickly and efficiently to trace the desired operational patterns.

The servo system of the apparatus preferably includes an integrator network which includes a feedback network. The net result of the network is to limit the acceleration speeds of the servomotors to a fraction of their deceleration speeds. This feature is important, as will become apparent, in providing damping in the system and in preventing undue hunting of the stylus assembly.

The integrator in the servo system is also constructed to prevent abrupt changes in the signals controlling the servomotors. This enables the servo system to follow all the controls exerted on the stylus, in spite of the inertia of the servo system.

While particular forms of the invention will be shown and described, it will be evident from the ensuing description that modifications may be made. It is intended to cover all such modifications as fall within the true spirit and scope of the invention in the claims appearing at the end of this specification.

In the drawings, which are intended to be merely illustrative of certain embodiments of the invention:

FIGURE 1 is a schematic representation of one embodiment of the invention using a recording table and a manually controlled stylus assembly for recording data on a magnetic tape, the various electrical components of the system being shown in block form in the illustrated system;

FIGURE 2 is a top plan view on a reduced scale and in somewhat schematic form of the recording table and associated stylus assembly, this view also showing in block form various servo systems which are controlled by the manual manipulation of the stylus and which drive the stylus assembly across the top of the recording table;

FIGURE 3 is a side elevational view of the recording table of FIGURE 2, also on a reduced scale, this latter view showing particularly the stylus assembly associated with the recording table and the manner in which it is suspended over the table and how it is mechanically coupled to the servo systems;

FIGURE 4 is an end view of the recording table and its associated equipment, this view being taken substantially on the line 4—4 of FIGURE 3 and showing particularly the mechanical coupling of the stylus assembly to one of the servo systems;

FIGURE 5 is a view, partly in section, of the stylus assembly associated with the recording table, the assembly including a pivoted stylus and a plurality of associated transformers and coils for providing electrical indications of the pivotal movements of the stylus and for restraining such movements for reasons to be described;

FIGURE 5a is a sectional view of the stylus assembly and is taken substantially on the line 5a—5a of FIGURE 5;

FIGURE 6 is a sectional view of the stylus assembly and is taken substantially on the line 6—6 of FIGURE 5; and FIGURES 7 and 8 are detailed circuit diagrams of the control system of the embodiment of the invention illustrated in FIGURE 1.

The system and apparatus of FIGURE 1 includes a recording table 10. This recording table has a top surface which is disposed, for example, in a horizontal plane and on which a graphic lay-out of the desired machine tool movements may be placed. As noted previously, this lay-out may be either full scale or a multiple of full scale, with respect to the controlled movements it represents.

A stylus assembly 12 is supported over the top surface of the table 10 for movements in either direction along a coordinate or abscissa axis and along an ordinate axis with respect to the top surface. This enables the stylus assembly to be moved to any point on the top surface of the table top.

In the embodiment of the invention to be described, the stylus assembly is moved to any selected position merely by manually tilting a vertically-supported stylus in the assembly in the direction the assembly is to be moved. A first pair of electrical leads 14 and 18 connects the stylus assembly to a control circuit 20, and a second pair of leads 22 and 26 connects the stylus assembly to a second control circuit 21. When the stylus is tilted to move the stylus assembly to the right, for example, across the top surface of the table 10 in FIGURE 1, an alternating signal having a first phase is produced across the leads 14 and 18. Alternately, when the stylus is tilted to move the assembly to the left across that surface, an alternating signal having an opposite phase is produced across the leads 14 and 18.

In like manner, when the stylus is tilted to move the stylus assembly downwardly across the top surface of the table 10 in FIGURE 1, an alternating signal having a first phase is produced across the leads 22 and 26. Upon the tilting of the stylus to move the assembly upwardly across the top surface, an alternating signal having the opposite phase is produced across the leads 22 and 26.

The control circuit 20 is constructed in a manner to be described to develop a positive direct voltage for motions of the stylus assembly toward the right along the co-ordinate axis (X-axis) and to develop a negative direct voltage for motions of the stylus assembly toward the left along the co-ordinate axis. This voltage is variable at any instant in accordance with the pivotal movements imparted at that instant to the stylus as indicated by lines 29. The voltage generated by the control circuit 20 is used to provide feedback signals to the stylus assembly 12 for stabilizing the movements of the stylus assembly. The voltage from the control circuit 20 is also introduced to an integrator 28, which operates to smooth the characteristics of the voltage and to provide feedbacks to enhance the controls exerted by the voltage.

The output from the integrator 28 is introduced directly to a driver stage 32 and is inverted by a phase inverter 30 and introduced in inverted form to a driver stage 34. The driver stages 32 and 34 normally develop a positive output voltage. However, for the right hand motions of the stylus assembly along the co-ordinate axis, the drive stage 32 inverts the positive voltage introduced to it so as to develop a negative output voltage, and for the left hand motions of the stylus assembly along that axis the driver stage 34 develops a positive output voltage from the negative voltage introduced to it from the phase inverter 30.

The driver stage 32 is connected to a pulse generator 36, and the driver stage 34 is connected to a pulse generator 38. So long as the driver stage 32 develops a positive output voltage, the pulse generator 36 is constrained to generate a series of pulses. In like manner, the generator 38 develops a series of output pulses whenever the driver stage 34 produces a positive output voltage.

The pulse generators 36 and 38 are respectively coupled to a servomotor 40 of known construction. The output pulses from the generator 36 cause the servomotor 40 to rotate, for example, in a clockwise direction. Alternately, the pulse output from the generator 38 causes the servomotor 40 to rotate in a counterclockwise direction. Although the servomotor is shown in block form in FIGURE 1, it should be appreciated that more than a motor may be included. For example, a magnetic counter similar to that disclosed and claimed in co-pending application Ser. No. 685,504 may be included to convert the output pulses from the generator 36 into corresponding rotary movements of a shaft.

The servomotor 40 is coupled to the stylus assembly through a threaded rod or lead screw 42. Therefore, the clockwise rotation of the servomotor drives the stylus assembly in one direction on the co-ordinate axis across the top surface of the table 10, and the counterclockwise rotation of the servomotor drives the stylus assembly in the opposite direction along that axis.

Therefore, to move the stylus assembly 12 along the co-ordinate axis to the right across the top surface of the table 10, it is merely necessary to tilt the stylus in that direction. This causes the servomotor 40 to be energized and the servomotor drives the stylus assembly in the direction indicated. Then, when the desired point is reached, the stylus is restored to its upright position and the servomotor 40 is de-energized and stops. In like manner, the stylus assembly can be moved to the left on the co-ordinate axis across the top of the table 10 by tilting it in the opposite direction. This causes the servomotor 40 to be operated in the opposite sense to drive the stylus assembly in the desired direction. Similarly the output from the control circuit 21 is used to provide feedback signals for establishing the movements of the stylus assembly 12, the feedback signals being indicated by lines 41 in FIGURE 1. The output from the control circuit 21 is also introduced to an integrator 42 which operates in a manner similar to the integrator 28. The output from the integrator 42 is in turn introduced directly to a driver stage 46 and is also inverted in polarity by a phase inverter 44 before being introduced to a driver stage 48. The driver stages 46 and 48 are, in turn, respectively connected to a pair of pulse generators 50 and 52. The pulse generators 50 and 52 are connected to a servomotor 54, and these pulse generators impart the same control on the servomotor 54 as the generators 36 and 38 impart to the servomotor 40. The servomotor 54 may be constructed in a manner similar to that described above for the servomotor 40 and may be considered to include other stages such as the magnetic counter disclosed in co-pending application Serial No. 685,504.

The servomotor 54 is mechanically coupled to a bracket supporting the servomotor 40 through a threaded rod or lead screw 56. In this manner, the actuation of the servomotor 54 causes the stylus assembly 12 to be driven across the table 10 along the ordinate axis in a direction perpendicular to the co-ordinate direction of drive of the servomotor 40.

Therefore, by appropriately tilting the stylus in the assembly 12, the stylus assembly can be moved to any position on the top surface of the recording table 10. In each instance, the stylus is driven to the selected position by the clockwise or counterclockwise rotation of the servomotor 40 for co-ordinate movements, and by the clockwise or counterclockwise rotation of the servomotor 54 for ordinate movements.

The pulse generator 36 is connected to a magnetic recording head 60. This head is mounted in any known type of multiple channel tape recorder, and it is adapted to record information or data in one channel of a magnetic tape 62 which is drawn through the recorder in the usual way. The pulse generator 38 is connected to a second magnetic head 64 in the tape recorder, and this second recording head is adapted to record data in a second channel on the magnetic tape 62. Likewise, the pulse generators 50 and 52 are connected to respective recording heads 66 and 68 of the tape recorder, and these latter recording heads are adapted to record data on their own individual channels on the magnetic tape 62.

Therefore, when the stylus assembly 12 is first manipulated from a reference position to a first point on the drafted lay-out, the pulse generators 36, 38, 50 and 52 generate respective series of pulses which correspond to the clockwise and counterclockwise motions of the servomotors 40 and 54 which were required to shift the stylus assembly to that particular point. Then, when the stylus assembly 12 is moved to the next point, a further series of pulses is generated by the various pulse generators. In each instance, all of the pulses are recorded in their appropriate channels on the tape 62.

It is evident, therefore, that should the tape be played back and the recorded pulses be picked up and applied to the servomotors 40 and 54, the servomotors would be controlled in exactly the same pattern in which they were manually controlled in the first instance. The described system, therefore, provides a record on the tape 62 that can be used to duplicate the controlled operations set up on the drafting lay-out on the top surface of the recording table 10. These data may be used in the manner described to control the ordinate and co-ordinate positions of a work table associated with a machine tool. In this manner, a repeated series of operations may be made rapidly and automatically on a succession of workpieces successively placed on the work table.

The mechanical details of the recording table 10 and its associated equipment are shown more clearly in FIGURES 2, 3 and 4. As shown in these figures, the stylus assembly 12 is supported on a pair of guide support rods 70 and 72 which extend through suitable slide bearings 74 and 76 of the stylus assembly to permit the assembly to slide freely along the rods. The ends of the rods 70 and 72 are connected to a pair of bracket assemblies 78 and 80 at the opposite sides of the table. These bracket assemblies are also adapted to slide on respective guide support rods 82 and 84. These latter rods extend in the ordinate direction under the top of the table 10 at the opposite sides of the table and at right angles to the guide rods 70 and 72. The bracket assemblies 78 and 80 are mounted on their respective guide rods 82 and 84 by means of suitable slide bearings 86 and 88.

It is evident that co-ordinate movements of the stylus assembly 12 along the guide rods 70 and 72 and ordinate movement of the bracket assemblies 78 and 80 along the guide rods 82 and 84 enable the stylus assembly to reach any point on the top surface of the table 10.

A first threaded rod or lead screw 90 is rotatably mounted on the bracket assemblies 78 and 80. This lead screw constitutes the lead screw shown schematically at 42 in FIG. 1, and extends between the bracket assemblies and through the stylus assembly 12. The lead screw 90 is rotatably mounted in the bracket assemblies 78 and 80, as noted above, and it threadably engages the stylus assembly 12. Therefore, rotation of the lead screw 90 causes the stylus assembly to move back and forth on the co-ordinate axis along the guide rods 70 and 72. The servomotor 40 is coupled to the lead screw 90 and the clockwise and counterclockwise rotation of that motor produces the desired repicrocal co-ordinate motion of the stylus assembly.

The servomotor 40 is represented in block form only, as such motors are believed to be well known to the art. Moreover, the servomotor 40, as well as the servomotor 54, are represented in FIGURES 2, 3 and 4 as each including a clutch and a speed increaser. These latter elements may have any known construction. As mentioned previously, the speed increaser enables the lay-out on the recording table 10 to be some multiple of the actual control that is to be exerted on the work table of the machine tool that is to be subsequently controlled. The speed increaser, in each instance, is disengaged from the system in known manner when the actual control is taking place.

Also, the servomotor 40 is shown as being provided with a usual counter 92, and the servomotor 54 has a usual counter 94. These counters, as mentioned previously, in conjunction with the usual clutch arrangements, enable the stylus assembly 12 to be repositioned manually on a new lay-out without disturbing the servo system. As also mentioned, this is important when a "blown-up" lay-out larger than the top of the table 10 is used.

A pair of ordinate threaded rods, or lead screws, 96 and 98 extend across the table at each side of the table and parallel to respective ones of the guide rods 82 and 84. The guide rods 82 and 84 are supported at their opposite ends by respective brackets 100 and 102 (FIGURE 4) these brackets being fastened to the table 10. The lead screws 96 and 98 constitute the lead screw shown schematically at 56 in FIG. 1, and are rotatably mounted in the brackets 100 and 102, respectively. They threadably engage respective ones of the bracket assemblies 78 and 80. Therefore, when the lead screws 96 and 98 are rotated, the brackets 78 and 80 are moved back and forth in the ordinate direction across the top surface of the table 10. This provides an ordinate of motion to the stylus assembly 12 which is perpendicular to its co-ordinate motion along the axis of the guide rods 70 and 72.

A shaft 104 extends across one side of the table 10 in a direction parallel to the guide rods 70 and 72. This shaft is coupled to the lead screws 96 and 98 by respective ones of a pair of couplers 106 and 108. The servomotor 54 is mechanically coupled to the shaft 104 through its clutch and speed increaser. Therefore, the clockwise and counterclockwise controlled rotation of the servomotor 54 produces a like rotation to the shaft 104.

Rotation of the shaft 104 is translated by the couplers 106 and 108 to the lead screws 96 and 98. The resulting rotation of the lead screws 96 and 98 causes the stylus 12 to move along the ordinate axis, as described above. It follows, therefore, that the energizing of the servomotors 40 and 54 to produce a controlled clockwise and counterclockwise rotation of these motors, results in the ability to move the stylus assembly 12 to any point on the top surface of the table 10.

In the illustrated assembly of FIGURES 2, 3 and 4, the controlled movement of the stylus assembly is obtained by manually pivoting a stylus 110 in the assembly in the direction to which it is desired to move the assembly across the lay-out to a selected point. This pivoting of the stylus 110 causes the servomotors 40 and 54 to be energized in a manner to be described so that the stylus assembly is driven along a selected path to the selected point, and it also causes corresponding data to be recorded on the magnetic tape 62 of FIGURE 1. When the manually held point of the stylus reaches the desired point on the table, it is held at this point and the servo system continues to operate until the stylus assembly has followed to a position directly over the stylus. This causes the stylus to be returned to its upright position to terminate the movement of the assembly 12 and to terminate the recording of the pertinent data on the magnetic tape.

Details of the stylus assembly 12 are shown somewhat schematically in FIGURES 5 and 6. The stylus 110 itself may be composed of steel or other magnetic material. The assembly includes a bracket or holder 112, and the stylus 110 is loosely supported in the holder. The holder has a flanged upper portion 114 and a flanged lower portion 116. The stylus extends between these upper and lower portions and through appropriate apertures in these portions. The stylus 110 is supported by a suitable bearing in the aperture in the lower portion to furnish a fulcrum for the stylus. Suitable bearings such as bearings 117 may be supported within the aperture in the flanged lower portion 116 to facilitate proper movements of the stylus 110 toward or away from the recording medium in accordance with the variations in the surface of the recording medium. The aperture in the top portion 114 is sufficiently large to permit the stylus to be pivoted back and forth in the fulcrum formed in the lower portion 116. A mass 118 may be provided at the top end of the stylus 110 to provide a damping action for preventing the stylus from oscillating or vibrating. The mass 118 provides such a damping action by lowering the resonant frequency of the stylus about its pivot position at the flanged portion 116. The pivot position of the stylus at the lower portion 116 is selected to give a greater movement at the top of the stylus within the holder 112 than at the bottom of the stylus.

A pair of transformers 120 and 122 are supported by the holder 112 in any appropriate manner (not shown). These transformers are positioned to have their cores 124 and 126 placed on opposite sides of the stylus 110. The transformers 120 and 122 are positioned near the top of the holder and just under the flanged portion 114. The cores 124 and 126 are U-shaped, as shown, and they define respective air gaps with the stylus 110. In each instance, the stylus completes the magnetic circuit of the cores of the respective transformers.

It is apparent that when the top portion of the stylus 110 is moved to the left in FIGURE 5, the air gap it forms with the core 124 of the transformer 120 will be decreased so as to decrease the reluctance of the magnetic circuit of the transformer 120. At the same time, the air gap that the stylus forms with the core 126 of the transformer 122 will be increased to increase the reluctance of the magnetic circuit of the transformer 122. When the upper portion of the stylus 110 is moved to the right in FIGURE 5, it is evident that the reverse conditions occur.

A second pair of transformers 128 and 130 are also supported in any convenient manner by the holder 112 at opposite sides of the stylus 110. The second pair of transformers are displaced angularly by 90° from the transformers 120 and 122. For convenient mounting, the transformers 128 and 130 may be axially displaced in the holder 112 to a position below the transformers 120 and 122.

The transformers 128 and 130 also include respective U-shaped cores 132 and 134. As before, these latter cores also define respective air gaps with the stylus 110 and the magnetic circuits of these cores are completed by the stylus. Therefore, movements of the upper portion of the stylus out of the plane of the representations of FIGURE 5 decreases the reluctance of the magnetic circuit of the core 132 of the transformer 128 and increases the reluctance of the magnetic circuit of the core 134 of the transformer 130. In like manner, movement of the upper portion of the stylus 110 into the plane of the representation in FIGURE 5 increases the reluctance of the magnetic circuit of the core 132 and decreases the reluctance of the magnetic circuit of the core 134.

The transformers 120 and 122 are connected in series as a first differential transformer as will be described in detail hereafter and the transformers 128 and 130 are connected in series as a second differential transformer. The arrangements are such that when the primaries of the differential transformers are energized with an alternating voltage and when the stylus 110 is exactly centered, the series-connected secondaries of the two differential transformer assemblies receive equal and opposite induced voltages which cancel.

However, if the upper portion of the stylus 110 moves to a position a little closer to the core 126 of the transformer 122 than to the core 124 of the transformer 120, an output voltage will result having the phase required to displace the stylus assembly in one direction along one of the axes. Likewise, opposite movement of the upper portion of the stylus will produce an output voltage having a phase to displace the stylus assembly in the opposite direction along that axis. Similarly, movement of the upper portion of the stylus with respect to the cores 132 and 134 of the transformers 128 and 130 will result in output voltages which produce shifts of the stylus assembly along the other one of the axes.

A pair of electro-magnetic coils 140 and 142 are mounted on opposite sides of the stylus 110 and directly below respective ones of the transformers 120 and 122. A further pair of electro-magnetic coils 144 and 146 are mounted on opposite sides of the stylus 110 directly below the coils 140 and 142 and angularly displaced by 90° with respect to the first pair of coils. Each of the coils has a magnetic core extending into proximity with the stylus 110. When any one of the coils is energized, the resulting magnetism in its core tends to draw the stylus towards that coil.

Whenever the differential transformer assembly 120 and 122 and the differential assembly 128 and 130 generates output voltages in response to a movement of the stylus 110, the resulting voltages are processed by appropriate circuits as will be described in detail subsequently and are introduced after processing to the appropriate ones of the coils 140, 142, 144 and 146 so that the motion of the stylus producing the voltage may be opposed and restrained. This improves the control of the stylus assembly, as will become evident as the description proceeds, in that it enables the speed with which the stylus assembly is driven to be essentially proportional to the manual pivotal pressure exerted on the stylus. It also tends to hold the stylus at its "zero" upright position in the absence of such manual pressure.

The control circuit associated with the stylus assembly 12, therefore, produces a group of four alternating output voltages having respective phases and amplitudes as determined by the direction and amount of manual tilt of the stylus 110. Each pair of alternating output voltages is converted by a different control circuit to a pair of direct voltages having amplitudes and polarities related to the amplitudes and phases of the alternating voltages. This conversion is obtained by the control circuits 20 and 21 and by circuits which will be described in detail subsequently. Each pair of direct voltages is fed to an integrating circuit which may be of the Miller type and which produces the required control of the pulse generators, as will be described. The integrator also includes a feedback system which limits the acceleration speeds of the servomotors away from zero to about half the decelerating speeds to provide damping for the servo loop. This latter feature, as will become apparent, is important in preventing undue "hunting" in the system. As described, one set of pulses from the pulse generators is used to excite the recording heads of a tape recorder to record the required data in independent channels on a magnetic tape, and another set of pulses from the generators is used to drive the servo systems which move the stylus assembly 12.

To record the data required to produce a machine tool movement along one axis, the operator takes hold of the stylus 110 (FIGURE 5) near its point and pushes the point of the stylus in the direction he wishes the stylus assembly to move. This action pivots the stylus and upsets the balance of the transformers 120, 122 and 128, 130. This causes the proper ones of the electro-magnetic coils 140, 142, 144 and 146 to be energized in a manner to oppose such pivotal motion.

The resulting alternating voltages from the differential transformers described above cause pulses to be supplied to the servomotors from the pulse generators to move the stylus assembly in the direction of the applied pressure. Also, the generated pulses are recorded in the proper channels on the magnetic tape.

The speed at which the stylus assembly moves across the lay-out is proportional to the pulse rate which, in turn, is substantially proportional to the manual pivotal pressure exerted on the stylus 110. Abrupt changes in the pulse rate are prevented by the integrator portion of the control circuit, as will be described, so that the servo system is able to follow in spite of its own inertia.

Because movement along each axis of the lay-out is in the direction of stylus pressure and at a speed proportional to stylus pressure, the operator can place a pressure on the stylus in any direction and the combined movements along the two axes will cause the stylus assembly 12 to move in the direction to which pressure is applied so as to trace any conceivable configuration.

As described, the multiple channel recording on the tape 62 of FIGURE 1 takes place simultaneously. When a recording is completed, it can be played back to drive the servomotors 40 and 54 and cause the stylus to retrace the pattern to which it was manually manipulated. This serves as an excellent and convenient check of the accuracy with which the original lay-out was recorded.

When the tape is played back to control the motion of the work table of a machine tool, for example, the servomotors 40 and 54 will produce the exact rotational movements that they went through when the operator was tracing out the lay-out. However, the magnetic tape speed can be increased so that the actual control of the work table takes place at a much faster rate. This, as noted previously, enables each workpiece to be processed at a speed much faster than the human limitations would permit an operator to trace out the original lay-out with any degree of accuracy.

As noted previously, usual and known types of gear drives may be used between the servomotors and their associated lead screws. Also, provisions may be made in known manner to change the gear ratios of these drives. If, for example, the drives are changed to drive the lead screws 90 and 96, 98 (FIGURES 2, 3 and 4) at a rate of two turns instead of one for the same servomotor rotation, the stylus will be driven twice as far and the lay-out can be made double size. This, as noted above, minimizes human tracing errors and allows greater recording accuracy when large "blow-ups" are used.

Detailed circuit diagrams of a suitable control system for the described mechanism of the invention are shown in FIGURES 7 and 8. These figures show the control system for the servomotor 40 for controlling the co-ordinate axis of motion of the stylus assembly 12. It will be realized that an identical control system may be used to control the servomotor 54, thereby to control the ordinate axis of motion of the stylus assembly.

The transformers 130 and 128 are shown in FIGURE 7 as connected in a differential manner. The primary winding of the transformer 130 is connected to one terminal of a source of alternating current 200 and to one terminal of the primary winding of the transformer 128. The frequency of the alternating current from the source 200 may, for example, be 2000 c.p.s. The other terminal of the primary winding of the latter transformer is grounded. The secondary windings of the transformers 128 and 130 are connected in series, and the lower side of the secondary winding of the transformer 128 is grounded.

The secondary windings of the transformers 130 and 128 are shunted by a capacitor 202, this capacitor having a capacity of, for example, .01 microfarad. The upper terminal of the secondary winding of the transformer 130 is connected to the control grid of a triode 204. The cathode of the triode 204 is connected to a grounded resistor 206. The resistor 206 has a value of, for example, 2.7 kilo-ohms. A resistor 208 is connected between the anode of the triode 204 and the positive terminal of a source of direct voltage 210. The value of the positive voltage from this source may, for example, be 250 volts. The source 210 also has a negative terminal, and it has a grounded common terminal.

A coupling capacitor 211 is connected in series with a potentiometer 212 between the anode of the triode 204 and ground. The potentiometer 212 has its armature connected to the control grid of a triode 214. The triode 204 and the triode 214 may be included in a single envelope, as is well known to the vacuum tube art.

The cathode of the triode 214 is connected to a resistor 216 having a value of, for example, 1.5 kilo-ohms. The anode of the triode 214 is connected to the primary winding of a transformer 218, the other terminal of this primary winding being connected to the positive terminal of the source 210. The primary winding of the transformer 218 is shunted by a capacitor 219 having a value of, for example, .002 microfarad.

The triodes 204 and 214 are connected as a usual resistance coupled cascade amplifier, and the output circuit of the amplifier is coupled through the transformer 218 to a ring demodulator 220. The ring demodulator includes a first pair of diodes 222 and 224, and a second pair of diodes 226 and 228. These diodes may be of the usual semi-conductor crystal type such as are presently designated as IN89.

The cathode of the diode 222 is connected to the anode of the diode 224, and this common junction is connected to one side of the secondary of the transformer 218. Likewise, the anode of the diode 226 is connected to the cathode of the diode 228, and this latter common connection is connected to the other terminal of the secondary winding of the transformer 218.

The center tap of the secondary winding of the transformer 218 is connected to the common junction of a 35 henry choke coil 230 and a grounded filter capacitor 232. The filter capacitor may have a value of .01 microfarad. The other terminal of the choke coil 230 is also connected to a grounded filter capacitor 234 of .01 microfarad. The choke coil 230 and the capacitors 232 and 234 constitute a usual filter network.

A pair of resistors 236 and 238 respectively connect the anode of the diode 222 and the cathode of the diode 226 to one side of the secondary winding of a transformer 240. Likewise, a pair of resistors 242 and 246 are respectively connected from the cathode of the diode 224 and the anode of the diode 228 to the other terminal of the secondary winding of the transformer 240. The center tap of this secondary winding is grounded. The primary winding of the transformer 240 has one terminal connected to ground, and the other terminal of this primary winding is connected to the other terminal of the source of alternating current 200.

The common junction of the choke coil 230 and the capacitor 234 is connected to the control grid of a triode 250. This triode and an additional triode 252 are connected as a differential direct current amplifier. These triodes may be included in a single envelope.

The cathode of the triode 250 and of the triode 252 are connected to one terminal of a variable resistor 254. This resistor constitutes a zero adjustment for the system, and it is adjusted so that zero voltage is developed at the output of the amplifier when the sylus 110 (FIGURE 5) is not manually tilted. The slider or armature of the resistor 254 is connected to one terminal of a resistor 256, the other terminal of the latter resistor being connected to the negative terminal of the source of direct voltage 210. The resistor 256 may have a resistance of 120 kilo-ohms.

A resistor 258 is connected between the anode of the triode 250 and the positive terminal of the source 210, and a resistor 260 is connected between the anode of the triode 252 and the positive terminal of that source. Each of these resistors may have a resistance of 100 kilo-ohms. A capacitor 262 and a resistor 264 are connected in series between the anode of the triode 250 and the control grid of the triode 252. The capacitor 262 may have a capacity of .003 microfarad, and the resistor 264 may have a resistance of 3.3 megohms.

The anode of the triode 252 is connected to one terminal of a 1.8 megohm resistor 266, the other terminal of this resistor being connected to the control grid of a triode 268. The triode 268 is connected as a cathode follower. The control grid of the triode 268 is connected to a resistor 270 which, in turn, is connected to the negative terminal of the source 210. The resistor 270 may have a resistance of 2.7 megohms.

The anode of the triode 268 is connected to the positive terminal of the source 210. A pair of series resistors 272 and 274 are connected between the cathode of the triode 268 and the negative terminal of the source 210 of direct voltage. The resistor 272 may have a resistance of 15 kilo-ohms, and the resistor 274 may have a resistance of 220 kilo-ohms.

The anode of the triode 250 is connected to a resistor 276 which, in turn, is connected to the control grid of a pentode 278. The resistor 276 may have a resistance of 1.8 megohms, and the pentode 278 may be the type presently designated as a 6AQ5. A resistor 279 is connected between the control grid of the pentode 278 and the negative terminal of the source 210. This latter resistor may have a resistance of 2.7 megohms. The anode of the pentode 278 is connected to one of the terminals of the electro-magnetic coil 146 described in conjunction with FIGURES 5 and 6. The other terminal of this coil is connected to the positive terminal of a source of direct voltage 280 of, for example, 150 volts. The negative terminal of this source is grounded. A resistor 282 is connected between the screen grid of the pentode 278 and the positive terminal of the source 280. The suppressor grid of the pentode 278 is connected to the cathode of this tube. The cathode of the pentode 278 is connected to a resistor 284 which may have a value of 100 ohms.

A resistor 286 is connected from the junction of the resistors 272 and 274 to the control grid of a pentode 287. This pentode also may be of the type designated as a 6AQ5, and the resistor 286 may have a resistance of 1 megohm.

The screen grid of the pentode 287 is connected to a resistor 288 which, in turn, is connected to the positive terminal of the source of direct voltage 280. The anode of the pentode 287 is connected to one terminal of the electro-magnetic coil 144 which was also described in conjunction with FIGURES 5 and 6. The other terminal of the coil 144 is connected to the positive terminal of the source 280. The suppressor grid of the pentode 287 is connected to its cathode, and a resistor 290 is connected to this cathode. The resistor 290 may have a resistance of 100 ohms. The resistors 284 and 290 are connected to a variable resistor 292, and the armature of this variable resistor is grounded. The variable resistor 292 determines and controls the pressure exerted by the restraining coils 146 and 144 on the manual pivotal movement of the stylus 110.

A double-pole single-throw switch 294 has both of its poles or armatures grounded. One of the fixed contacts of the switch 294 is connected to the junction of the variable resistor 292 and the resistors 284 and 290. The other fixed contact of the switch 294 is connected to a fixed contact of a single-pole double-throw switch 296. The latter fixed contact is further connected to a resistor 298 and to a resistor 300. The resistor 298 is connected to the cathode of the triode 268, and the resistor 300 is connected to the control grid of the triode 252. A grounded resistor 302 is also connected to the latter control grid. The resistor 298 may have a resistance of 33 kilo-ohms, the resistor 300 may have a resistance of 1 megohm, and the resistor 302 may have a resistance of 330 kilo-ohms.

The pole or armature of the switch 296 is connected to a terminal 304 which constitutes the output terminal for the portion of the control system shown in FIGURE 7 and the input terminal for the integrator portion shown in FIG. 8.

The other fixed contact of the switch 296 is connected to the slider or armature of a potentiometer 310. The fixed contacts of the potentiometer are connected respectively to the positive and negative terminals of a source of direct voltage 312 which may have a value of, for example, 30 volts. This source has a grounded common terminal, and the potentiometer has a grounded center tap. It is evident that as the armature is moved from one end of the potentiometer 310 to the other, that voltages varying from +15 to −15 with respect to ground are developed at the latter fixed contact of the switch 296.

The primary windings of the transformers 128 and 130, which as noted above are located on opposite sides of the stylus 110 and in line with the axis of stylus movement which they control, are energized by the 2000-cycle excitation current from the source 200. As long as the stylus 110 remains equidistant from the cores of the two transformers, there will be like magnetic paths across the respective air gaps and through a portion of the stylus. This causes the secondary windings of the transformers 128 and 130 to have equal but oppositely phased voltages induced across them. Because the secondary windings are connected in series, the total output voltage is zero.

However, if a manual pivotal pressure exerted on the stylus 110 causes its upper portion to move nearer to the core 134 of the transformer 130 than the core 132 of the transformer 128, the magnetic reluctance of the magnetic circuit of the transformer 130 will decrease and the voltage induced in the secondary winding of the transformer 130 will increase. At the same time the reluctance of the magnetic circuit of the transformer 128 will increase, causing the voltage induced in its secondary winding to decrease. The net output signal across the secondary windings, therefore, will be an alternating voltage with a phase corresponding to that of the voltage appearing across the secondary winding of the transformer 130 and with a magnitude depending upon the amount of stylus deflection from its center position.

On the other hand, should the stylus be pivotally deflected so that its upper portion moves toward the core 132 of the transformer 128, and away from the core 134 of the transformer 130 an alternating output signal will appear across the secondary windings of a phase corresponding to the phase of the voltage across the secondary winding of the transformer 128 and with a magnitude dependent upon the amount of such stylus deflection.

The alternating output signal from the secondaries of the differentially connected transformers 128 and 130 is introduced to the triode 204 for amplification. The amplified signal is further amplified by the triode 214. The amplified alternating output signal from the triode 214 is translated through the transformer 218 to the ring demodulator 220.

The amplitude of the voltage produced by the ring demodulator 220 is dependent upon the differential voltage from the transformers 128 and 130. The polarity of the voltage produced by the ring demodulator 220 is dependent upon the phase of the differential voltage from the transformers 128 and 130 relative to the phase of the voltage applied to the transformer 240. This will be seen from the following discussion.

In a first half cycle of alternating voltage, a positive voltage may be introduced to the ungrounded terminal of the primary winding in the transformer 240. This causes a positive voltage to be developed at the upper terminal of the secondary winding in the transformer 240 and a corresponding voltage of negative polarity to be developed at the lower terminal of the winding. As a result of this voltage difference, current flows through a circuit including the resistance 236, the diodes 222 and 224, the resistance 242 and the secondary winding of the transformer 240. Because of the balanced effect produced by the diodes 222 and 224 and the resistances 236 and 242, the current flowing through these members produces a ground terminal on the cathode of the diode 222 and the anode of the diode 224.

With the ground established in the previous paragraph, a negative voltage is introduced from the center tap of the secondary winding in the transformer 218 when a voltage is induced in the winding to make the upper terminal of the winding more positive than the lower terminal of the winding. Similarly, a positive voltage is introduced to the capacitance 232 from the center tap of the secondary winding in the transformer 218 when a voltage is induced in the winding to make the lower terminal of the winding more positive than the upper terminal of the winding.

In like manner, a ground potential is produced at the common terminal between the diodes 226 and 228 when a negative potential is introduced to the ungrounded terminal of the primary winding in the transformer 240. This causes a negative potential to be produced across the capacitance 232 when the potential on the lower terminal of the secondary winding in the transformer 218 is relatively high. Similarly, a positive potential is produced across the capacitance 232 when the secondary winding of the transformer 218 has a relatively high potential on its upper terminal.

It will be seen from the previous discussion that the ring demodulator 220 operates to convert an alternating voltage from the transformers 128 and 130 into a pulsating direct potential across the capacitance 232. The direct potential has a negative polarity when the phases of the alternating voltages introduced to the transformers 218 and 240 coincide. A direct potential of positive polarity is produced when the voltage introduced to the transformer 218 has a phase opposite to that introduced to the transformer 240. The amplitude of the direct voltage produced across the capacitance 232 corresponds to the amplitude of the alternating voltage introduced to the transformer 218.

The output signal from the ring demodulator 220 appears at the center tap of the secondary winding of the transformer 218. This output signal is a direct voltage which is zero when the stylus 110 is properly centered with respect to the transformers 130 and 128. This direct voltage, however, is positive when the stylus 110 is pivotally deflected in one direction, and it is negative when the stylus is pivotally deflected in the opposite direction. Moreover, the amplitude of the direct voltage at the center tap of the transformer 218 is proportional to the displacement of the stylus in either direction. The filter composed of the choke coil 230 and of the filter condensers 232 and 234 functions to remove the pulsating components from the direct voltage, before the control voltage is fed to the control grid of the triode 250.

The triodes 250 and 252 are connected to form a differential type of direct current amplifier. The circuit of these triodes holds the control grid of the triode 252 at essentially zero voltage when the direct voltage input signal at the control grid of the triode 250 is zero. For this condition, each triode draws substantially the same amount of current and a positive voltage drop is established across the cathode resistors 254 and 256. This voltage drop, for example, may be of the order of about 252 volts. This causes the cathodes of the triode 250 and of the triode 252 to be positive with respect to ground, the positive voltage on the cathodes being about 2 volts. The plate currents through the triodes 250 and 252 places their anodes at a voltage of, for example, about 150 volts.

The anode of the triode 250 is connected through the voltage divider formed by the resistors 276 and 279 to the negative terminal of the source 210. Under the balanced condition described in the preceding paragraph, the common junction of these resistors and, therefore, the control grid of the pentode 278 are held at a negative voltage. This negative voltage may have a value, for example, of approximately −15 volts when the zero adjustment resistor 254 is properly adjusted. The anode of the triode 252 is connected to a similar voltage divider composed of the resistors 266 and 270. This latter voltage divider is connected to the control grid of the triode 268. Under the balanced conditions described above, this control grid is held at a negative voltage of the order of −4 volts, for example. This voltage is more positive than the voltage introduced to the cathode of the triode 268 from the source 210. In this way, the triode 268 is maintained in a normally conductive state.

Conduction through the cathode follower triode 268 causes its cathode voltage to approximate zero volts, and the voltage drop through the resistor 272 places the control grid of the pentode 287 at a negative voltage. This negative voltage may, for example, be about −15 volts.

The pentodes 278 and 287 are connected as individual driver stages for the electro-magnetic coils 144 and 146, and their respective anodes are connected to the coils 146 and 144 which, as previously noted, resist the manual pivotal movements of the stylus. Since both the pentodes 278 and 287 have about −15 volts on their control grids when the shaft of the stylus is centered, equal and slight currents pass through these coils and they exert small and equal opposing pulls on the stylus 110 (FIGURE 5).

If a manual pressure is applied to the stylus 110 tending to pivot its upward portion toward the core 134 of the transformer 130 and away from the core 132 of the transformer 128, the secondaries of the differentially connected transformers 130 and 128 develop an alternating output signal of a particular phase which is amplified by the triodes 204 and 214. The resulting amplified alternating signal is demodulated by the ring demodulator 220, and the resulting direct voltage is applied to the control grid of the triode 250 of the differential amplifier. This direct voltage is positive for the particular pivotal deflection of the stylus, and it is amplified by the triode 250 and its polarity is reversed. The resulting negative voltage is then fed to the control grid of the pentode 278 to render that pentode non-conductive. This interrupts the current flow through the coil 146 and decreases its magnetic pull on the stylus.

A positive voltage change occurs at the anode of the triode 252 because of the differential characteristics of the amplifiers. This positive voltage change is of a magnitude equal to that of the negative voltage change which occurred at the anode of the triode 250. This positive voltage change at the anode of the triode 252 causes the control grid of the cathode follower triode 268 to have a positive going voltage introduced to it. The output voltage from the cathode follower increases, therefore, in the positive direction. Conduction through the pentode 287 is, therefore, increased, and the resulting increased current through the coil 144 increases its magnetic pull on the stylus. This, together with the decreased magnetic pull of the coil 146, opposes the pivotal manual pressure which is moving the upper portion of the stylus 110 out of the center position between the cores of the transformers 128 and 130.

In like manner, the pivotal deflection of the stylus in the opposite direction causes the transformers 128 and 130 to develop an oppositely phased signal which, in turn, causes the ring demodulator 200 to develop a negative voltage. The differential amplifier including the triodes 250 and 252 responds to this voltage to cause the drive pentodes 278 and 287 to increase the current flow in the coil 146 and to decrease the current flow in the coil 144. These coils, therefore, function as before to oppose the manual pivotal pressure on the stylus.

The direct current amplifier triodes 250 and 252 and the cathode follower triode 268 are stabilized by the feedback obtained from the cathode of the tube 268. This feedback is obtained through a loop which includes the resistances 300 and 302 connected as a voltage divider. The feedback loop places on the control grid of the triode 252 a direct voltage which is proportional to the output from the cathode follower 268. The feedback loop is instrumental in stabilizing the operation of the circuit by preventing a drift of direct potential as the components age or change tolerances.

In addition to the negative feedback, positive feedback is provided by the series branch formed by the capacitance 262 and the resistances 264 and 302. This positive feedback acts to provide a fast response on the grid of the triode 252 to changes in the voltage introduced to the grid of the tube 250. The quick response is obtained because of the operation of the capacitance 262 and the resistances 264 and 302 as a feedback unit. Because of this quick response, lags produced in other portions of the circuitry are compensated so as to prevent the stylus 110 from vibrating in attempting to obtain the proper positioning.

The input voltage to the integrator circuit for controlling the recording pulses and the movement of the servomotor 40 is produced at the cathode of the cathode follower triode 268. As noted, the resistor 254 is adjusted to give a zero integrator input when there is no pressure on the pencil. Control of the resistor 292 adjusts the pressure by which the pivotal movement of the stylus is opposed by the electro-magnetic coils 144 and 146, as noted above. The adjustment of the potentiometer 212 determines the stylus deflection required to produce a given speed of the controlled servomotor 40.

To prevent recording errors and the movement of the servomotor 40 from slight pressures on the stylus 110 when it is meant to be at rest, the operator may close the switch 294. This short circuits the terminal 304 to ground to make any controlled movement of the servomotor 40 impossible. This actuation of the switch 294 also short circuits the negative feedback loop formed by the resistances 300 and 302 to restore maximum amplifier gain, and this actuation of the switch additionally short circuits the resistor 292 to give maximum opposing pressures from the electro-magnetic coils 144 and 146. In this manner, small accidental pivotal pressures on the stylus as, for example, from a straight edge or from a template are adequately opposed and no spurious deflection of the stylus occurs.

In the manner described, an output voltage appears at the terminal 304 and this voltage is essentially zero when the stylus 110 is centered with respect to the transformers 128 and 130. However, pivotal motion of the stylus causing its upper portion to be displaced towards one of the transformers produces a positive direct voltage at the output terminal 304. Alternately, a pivotal deflection of the stylus causing its upper portion to approach the other transformer produces a negative voltage at the output terminal 304.

Instead of the manual pivotal control of the stylus described in the preceding paragraphs, the operator can move the switch 296 to its lower fixed contact and manipulate the potentiometer 310. This manipulation of the potentiometer places positive and negative voltages on the output terminal 304 to produce the identical control on the controlled servomotor 40 as is produced by the pivotal control of the stylus 110. Also, and as noted previously, the manual control of the potentiometer 310 may be used to produce a direct control on the work table of the controlled machine tool. This control may be used to cause the machine tool to perform a desired set of operations on a particular workpiece and, at the same time, record the necessary data on the tape. Then, and under the subsequent control of the tape, the machine tool can be caused to duplicate the operation on each of a succession of subsequent workpieces.

It will be appreciated that similar circuitry to that shown in FIGURE 7 may be coupled to the transformers 120 and 122. This latter circuitry is used to control the servomotor 54. With reference now to FIGURE 8, it will be observed that the terminal 304 is connected to a resistor 320 of, for example, 270 kilo-ohms. The other side of the resistor 320 is connected to a variable resistor 322 having a maximum resistance of 5 megohms. A still further resistor 324 is connected between the variable resistor 322 and the control grid of a triode 326. The resistor 324 may, for example, have a resistance of 560 kilo-ohms.

The anode of the triode 326 is connected to a resistor 328 which, in turn, is connected to the positive terminal of the source of direct voltage 210. The cathode of the triode 326 is connected to the cathode of a triode 330, and both these triodes may be enclosed within a common envelope. The anode of the triode 330 is connected to a resistor 332, and the resistor is connected to the positive terminal of the source 210. The resistor 322, like the resistor 328, may have a resistance of 220 kilo-ohms. A resistor 334, also of 220 kilo-ohms, is connected between the cathodes of the triodes 326 and 330 and the negative terminal of the source 210.

The control grid of the triode 330 is connected to a grounded resistor 336, this resistor having a value of 1 megohm. The anode of the triode 330 is further connected to a resistor 338 having a value of 10 megohms. The resistor 338 is connected to the control grid of a triode 340, and a resistor 342 is connected between that control grid and the negative terminal of the source 210. The resistor 342 has a resistance of 20 megohms.

A pair of resistors 344 and 346 are connected from the positive terminal of the source of direct voltage 210 to ground. The resistor 344 may have a resistance of 270 kilo-ohms, and the resistor 346 has a resistance of 4.7 kilo-ohms.

A diode 348 has its cathode connected to the junction of the resistors 344 and 346, and a second diode 350 has its cathode connected to the anode of the diode 348. Likewise, a diode 352 has its cathode connected to the common junction of the resistors 344 and 346, and a diode 354 has its cathode connected to the anode of the diode 352. Each of these diodes may be formed from a semi-conductor crystal, and they may each be of the type presently designated as 1S1.

The anode of the diode 348 and the cathode of the diode 350 are connected to a resistor 356 which, in turn, is connected to the control grid of the triode 330. The resistor 356 may have a resistance of 2.2 megohms.

A resistor 358 is connected between the anode of the diode 350 and the negative terminal of the source of direct voltage 210. In like manner, a resistor 360 is connected between the anode of the diode 350 and ground. The anodes of the diodes 350 and 354 are connected together. The resistor 358 has a resistance of 270 kiloohms, and the resistor 360 has a resistance of 4.7 kiloohms.

The anode of the diode 352 and the cathode of the diode 354 are connected to a lead 362. This lead is connected to the junction of the resistor 320 and of the variable resistor 322.

The anode of the triode 340 is connected to a resistor 364 having a resistance of, for example, 1.5 megohms. The resistor 364 is connected to one terminal of a potentiometer 366, the other terminal of the potentiometer being connected to a resistor 368. The resistor 368, in turn, is connected to the negative terminal of the source 210. The potentiometer 366 has a resistance of 0.5 megohm. The potentiometer 366 serves as a balance adjustment, as will become apparent. The pole or armature of the potentiometer 366 is connected to the junction of the resistor 320 and the variable resistor 322.

The anode of the triode 340 is further connected to a resistor 370 which, in turn, is connected to the positive terminal of the source 210. The resistor 370 may, for example, have a resistance of 68 kilo-ohms. The anode of the triode 340 is also connected to one terminal of a resistor 372 of, for example, 1.5 megohms. The cathode of the triode 340 is grounded. A capacitor 341 is connected to the anode of the triode 340 and to the control grid of the triode 326. This latter capacitor may have a capacity of .05 microfarad.

The other terminal of the resistor 372 is connected to the control grid of a triode 374. This triode may be included in the same envelope as the triode 340. The cathode of the triode 374 is grounded. A resistor 376 is connected between the control grid of this triode and the negative terminal of the source 210. This resistor may have a resistance of 1.2 megohms. A resistor 378 is connected between the control grid of the triode 374 and its anode. This latter resistor has a resistance of 1.5 megohms.

The anode of the triode 374 is connected to one terminal of a resistor 380. The other terminal of this resistor is connected to the positive terminal of the source 210, and the resistor has a resistance of 68 kilo-ohms.

The anode of the triode 340 is connected to a resistor 382 which, in turn, is connected to the control grid of a triode 384. The anode of the triode 374, on the other hand, is connected to a resistor 386 which is connected to the control grid of a triode 388. The triodes 384 and 388 may be included in a single envelope. The resistors 382 and 386 may have a resistance of 3 megohms.

A resistor 389 is connected between the control grid of the triode 384 and the negative terminal of the source 210, and a resistor 390 is connected between the control grid of the triode 388 and this negative terminal. Each of the resistors 389 and 390 may have a resistance of 1.5 megohms.

The cathode of the triode 384 is connected to the cathode of the triode 388. A variable resistor 392 is connected to these cathodes and to a resistor 394. The other terminal of the resistor 394 is connected to the negative terminal of the source 210. The variable resistor 392 may have a resistance of 10 kilo-ohms, and the resistor 394 may have a resistance of 15 kilo-ohms.

A resistor 396 connects the anode of the triode 384 to the positive terminal of the source 210, and a resistor 398 connects the anode of the triode 388 to that terminal. Each of the resistors 396 and 398 has a resistance of 68 kilo-ohms.

A diode 400 has its cathode connected to the anode of the triode 384, and a diode 402 has its cathode connected to the anode of the triode 388. The anodes of the diodes 400 and 402 are grounded. Each of the diodes 400 and 402 may be of the type presently designated as a 5V1.

The anode of the triode 384 is connected to a resistor 404, and the anode of the triode 388 is connected to a resistor 406. The resistor 404 is connected to the control grid of a triode 408, and the resistor 406 is connected to the control grid of a triode 410. The two latter resistors may each have a resistance of 10 megohms. The triodes 408 and 410 may be included in a single envelope.

A pair of resistors 412 and 414 respective connect the anodes of the triodes 408 and 410 to the positive terminal of the source 210. Each of these resistors may have a resistance of 100 kilo-ohms. The cathodes of the triodes 408 and 410 are connected together and a resistor 416 is connected between these cathodes and the negative terminal of the source 210. The resistor 416 may have a resistance of 120 kilo-ohms.

A pair of resistors 418 and 420 are connected in series between the anode of the triode 408 and the negative terminal of the source 210. The resistor 418 has a resistance of 3 megohms, and the resistor 420 has a resistance of 5.6 megohms. The common junction of these two resistors is connected to the lead 362.

A pair of series-connected resistors 422 and 424 are connected between the anode of the triode 410 and the negative terminal of the source 210. The resistor 422 has a resistance of 1.5 megohms and the resistor 424 has a resistance of 3 megohms. The common junction of these resistors is connected to a lead 426 which extends to the junction of the resistor 356 and the diodes 348, 350.

The anode of the triode 384 is connected to one of the fixed contacts of a potentiometer 428 having a resistance of 1 megohm. The other fixed contact of the potentiometer 428 is connected to the fixed contact of a second potentiometer 430 whose other fixed contact is grounded. The potentiometer 430 has a resistance of .5 megohm, and its armature is grounded.

The armature of the potentiometer 428 is connected to a 2.2 megohm resistor 432, and a 10 megohm resistor 434 is connected between the resistor 432 and the control grid of a triode 436. A diode 438 has its anode connected to the control grid of the triode 436, and the cathode of this diode is connected to the junction of the resistors 432 and 434. A grounded capacitor 440 is also connected to the control grid of the triode 436. This capacitor may have a capacity of 680 micromicrofarads.

The anode of the triode 436 is connected to the junction of a pair of 1 megohm resistors 442 and 444 which are connected in series between the positive terminal of the source 210 and ground. A coupling capacitor 446 is connected between the anode of the triode 436 and the control grid of a triode 448. The triode 436 and the triode 448 may be included in a single envelope. A resistor 450 is connected between the control grid of the triode 448 and the positive terminal of the source 210. Likewise, a resistor 452 is connected between the anode of the triode 448 and that positive terminal. The resistor 450 may have a resistance of 3.9 megohm, and the resistor 452 may have a resistance of 11 kilo-ohms.

The cathode of the triode 436 is connected to the cathode of the triode 448. A pair of series-connected resistors 454 and 456 are connected between the cathode and ground. The resistor 454 may have a resistance of 2.2 kilo-ohms, and the resistor 456 has a resistance of 1.5 kilo-ohms. A coupling capacitor 458 of .01 microfarad is connected to the common junction of the resistors 454 and 456 to supply actuating pulses for clockwise rotation to the servomotor 40 in the manner described in FIGURE 1.

A capacitor 460 of .1 microfarad is connected to the anode of the triode 448, and a diode 462 has its cathode connected to that capacitor and its anode grounded. A pair of resistors 464 and 466 are connected from the common junction of the capacitor 460 and the diode 462 to the negative terminal of the voltage source 210. The resistor 464 may have a resistance of 1 kilo-ohm and the resistor 466 has a resistance of 56 kilo-ohms.

The recording head 60 discussed in FIGURE 1 has one terminal connected to the common junction of the resistors 464 and 466, and the other terminal of this recording head is grounded.

The anode of the triode 388 is connected to one of the fixed contacts of a 1 megohm potentiometer 468. A second potentiometer 470 is connected between the other fixed contact of the potentiometer 468 and ground. The potentiometer 470 has a resistance of .5 megohm, and its armature is grounded.

The slider or armature of the potentiometer 468 is connected to a 2.2 megohm resistor 472, and a 10 megohm resistor 474 is connected between the resistor 472 and the control grid of a triode 476. A capacitor 479 is connected between that control grid and ground, and this capacitor has a capacitance of 680 micromicrofarads. A diode 480 has its anode connected to the control grid of the triode 476, and the cathode of this diode is connected to the junction of the resistors 472 and 474.

A pair of resistors 482 and 484 are connected between the positive terminal of the source 210 and ground. Each of these resistors has a resistance of 1 megohm. The anode of the triode 476 is connected to the common junction of the resistors 482 and 484.

The cathode of the triode 476 is connected to the cathode of a triode 478. A pair of resistors 481 and 483 are connected in series between these cathodes and ground. The resistor 481 has a resistance of 2.2 kilo-ohms, and the resistor 483 has a resistance of 1.5 kilo-ohms. A coupling capacitor 485 of .01 microfarad couples the common junction of the resistors 481 and 483 to the servomotor 40 to provide the counterclockwise drive pulses to that servomotor. A coupling capacitor 486 of .001 microfarad is connected between the anode of the triode 476 and the control grid of the triode 478. These triodes may be included in a single envelope.

A resistor 488 is connected to the control grid of the triode 478 and to the positive terminal of the source 210. A resistor 490 is connected to the anode of the triode 478 and to that positive terminal. The resistor 488 may have a resistance of 3.9 megohms and the resistor 490 may have a resistance of 11 kilo-ohms.

A capacitor 492 is connected to the anode of the triode 478 and to the cathode of a diode 494. This capacitor may have a capacity of .1 microfarad. The anode of the diode 494 is grounded, and this diode may be of the type presently designated as a 3V1.

A pair of resistors 496 and 498 are connected in series from the junction of the capacitor 492 and the diode 494 to the negative terminal of the source 210. The counterclockwise recording head 64 described in conjunction with FIGURE 1 has one terminal connected to the junction of the resistors 496 and 498, and the other terminal of this head is grounded. The resistor 496 may have a resistance of 1 kilo-ohm, and the resistor 498 may have a resistance of 56 kilo-ohms.

The triodes 326, 330 and 340 are included in the integrator portion of the control circuit. The first two triodes 326 and 330 are connected as a direct current differential amplifier, and the third triode 340 is connected as a conventional direct current amplifier. With the control grids of the triodes 326 and 330 at ground potential, these triodes conduct and draw current through the cathode resistor 334 until their cathode voltages assume a positive value of, for example, about 2 volts. The voltage drop across each of the anode resistors 328 and 332 under these conditions may be of the order of 126 volts, so that in the illustrated embodiment the anodes of the triodes 326 and 330 are established at approximately 124 volts.

The input signal introduced to the input terminal 304 is fed through the resistor 320 and through the resistors 322 and 324 to the control grid of the triode 326. The control grid of the triode 330 is used to inject negative feedback into the integrator circuit. This feedback voltage is produced on the lead 426 in a manner to be described. The feedback voltage is controlled by the voltage divider formed by the resistors 356 and 336 and it is limited to a selected positive and negative value (as, for example ±5 volts) by the forward conduction through one or the other of the biased diodes 348 and 350. The diode 348 is biased by a voltage divider formed by the resistors 344 and 346 and the diode 350 is biased by a voltage divider formed by the resistors 358 and 360. The voltage divider formed by the resistors 356 and 336 introduces, therefore, a feedback voltage of between plus and minus 1.6 volts to the control grid of the triode 330.

The feedback voltage described above affects the conduction of the triode 330, and it consequently affects the conduction of the triode 326, when its amplitude is such to drive the control grid of the triode 330 between plus and minus 1.6 volts. Beyond these limits, changes in the feedback voltage have no effect on the system.

When the control grid of the triode 326 is driven by the input signal to between plus and minus 1.6 volts, for example, the control grid of the triode 330 follows this swing due to the feedback voltage. Therefore, the effect of this input signal is cancelled because it is not strong enough to overcome the feedback voltage which cuts off the output from the triode 330. This provides for zero integrator output when the integrator input signal is within the range of ±1.6 volts. This expedient provides a definite and well-defined stop range for the servomotor 40.

The output from the differential amplifier formed by the triodes 326 and 330 is taken from the anode of the triode 330, and any output signals are introduced to the control grid of the direct current amplifier triode 340 through the voltage divider formed by the resistors 338 and 342. The integrator output at the anode of the triode 340 is applied through the capacitor 341 back to the control grid of the triode 326 to provide additional negative feedback for the differential amplifier, for reasons to be described.

The input signal from the terminal 304 is limited before it reaches the resistor 322 to a selected voltage excursion of, for example, ±5 volts. This limitation is provided by forward conduction through one or the other of the biased diodes 352 and 354. These diodes are biased in known manner by respective ones of the voltage dividers formed by the resistors 344 and 346 and by the resistors 358 and 360. This produces a constant current flow through the resistors 322 and 324 for the higher amplitude signals. This current flow causes the capacitor 341 to be charged at a linear rate and limits the rate of change of the integrator output. This feature enables the servo system to follow abrupt changes in the pivotal pressure exerted on the stylus 110, despite the inertia of the servo system.

The voltage divider formed by the resistors 364 and 368 and the potentiometer 366 provides an adjustable negative direct current feedback from the integrator output to hold the integrator in a quiescent state when the input signal from the terminal 306 is zero. This feedback also causes the output of the integrator to return rapidly to zero when the input signal is reduced to zero. This return is further increased by a negative feedback derived through the lead 362 from the anode of the triode 408 whose function will be discussed subsequently.

The triode 374 serves as a direct current phase inverter. The voltage divider formed by the resistors 372, 376 and 378 and the triode 340 holds the grid voltage of the triode 374 approximately at ground potential in the absence of an applied signal. However, when a negative going signal on the grid of the triode causes the voltage at the anode of this triode to increase in a positive sense, this latter increase tends to pull the control grid of the triode 374 positive. However, this tendency increases the current flow through the triode 374 which decreases its plate voltage and holds its control grid near the original ground potential. Therefore, as the plate voltage of the triode 340 swings in one direction, the plate voltage of the triode 374 swings in the opposite direction.

The triodes 384 and 388 are direct current driver tubes which are used to drive the two pulse generator circuits of the triodes 436 and 448 and the triodes 476 and 478. The control grid of the triode 384 is controlled by the output voltage from the anode of the triode 340 through the voltage divider formed by the resistors 382 and 389. In like manner, the output voltage from the triode 374 controls the control grid of the triode 388 through the voltage divider made up by the resistors 386 and 390.

When the integrator input signal at the input terminal 306 is zero and when the potentiometer 366 is adjusted for a balanced condition, the anode voltages of the triodes 340 and 374 are equal. Consequently, the voltages on the control grids of the triodes 384 and 388 are equal. These latter voltages may be established at about −115 volts, for example. The triodes 384 and 388 have their cathodes connected together, as previously noted, and these cathodes draw current from the negative terminal of the source 210 through the resistor 394 and the potentiometer 392 to place a negative voltage on the cathodes. The anode resistors 396 and 398 place the anodes of the triodes 384 and 388 at a positive voltage (of, for example, +25 volts) in the balanced condition of the system. An adjustment of the resistor 392 changes the total current through the triodes 384 and 388 to raise or lower the plate voltages, so that the two pulse generators driven by the triodes can be held at an input voltage just below cut-off (at about +30 volts) when the integrator circuits are in balance. Therefore, in the absence of an input signal, neither of these pulse generators produce output pulses.

The diodes 400 and 402 prevent the anodes of the driver triodes 384 and 388 from going negative with respect to ground. This enables a sufficent voltage drop across these tubes to be maintained to force conduction of the total current through either triode without driving the cathodes negative. If the cathodes of these triodes were allowed to be driven negative, the negative signal from the triode 340 or the triode 374 would never be sufficient to completely cut off its controlled triode 304 or 388. The output signals from the driver triodes would then be extremely weak and the rates of the pulses from the pulse generator would be low.

The triodes 408 and 410 form a differential direct current amplifier, and this latter amplifier is used only for feedback purposes. The amplifier of the triodes 408 and 410 senses which of the anodes of the triodes 384 and 388 is the more positive, and it then functions to provide direct current feedback voltages from the junction of the resistors 418 and 420 on the lead 362, or from the junction of the resistors 422 and 424 on the lead 426.

When the control grid of the triode 408 becomes more positive than the control grid of the triode 410, the current through the triode 410 decreases and the feedback voltage on the lead 426 becomes positive. At the same time, the current through the triode 408 increases, causing the feedback voltage on the lead 362 to be negative. When the control grid of the triode 410 is the more positive, on the other hand, the feedback voltage on the lead 362 will be positive and the feedback voltage on the lead 426 will be negative.

When the positive input signal, for example, is introduced to the input terminal 306, the initial effect of the rising direct voltage is cancelled as a result of the feedback action described. This feedback action aids in cancelling the effect of the first 1.6 volts of positive input voltage on the control grid of the triode 326. The direct current gain of the feedback loop is so high that the voltage at the control grid of the triode 330 will follow that at the control grid of the triode 326 within a fraction of a millivolt until the saturation voltage is reached. The feedback loop holds the clockwise and counterclockwise driving voltages to within one-half a volt of each other during the dead band period so that no pulses are generated by the pulse generators formed by the triodes 436 and 448 and the triodes 476 and 478.

The anode voltage of the triode 340 changes by only a few millivolts during this dead band period and the charge on the capacitor 341 changes by a negligible amount so that integration is not yet initiated. As the positive integrator input voltage continues to rise, however, the diode 352 limits the voltage on the control grid of the triode 330 to 1.6 volts, as described above. Now, as the input signal drives the control grid of the triode 326 so that it rises above the 1.6 volts to which the opposite control grid of the triode 330 is limited, the resulting increased conduction of the triode 326 increases the voltage drop across the common cathode resistor. This decreases the conduction of the triode 330 so that its anode voltage rises.

The rise in the anode voltage of the triode 330 swings the control grid of the triode 340 in the positive direction. This latter swing causes the anode of the triode 340 to go negative at a rapid rate. Therefore, the coupling through the capacitor 341 holds the control grid of the triode 326 at only slightly above 1.6 volts. At this time, the capacitor 341 is charged at a constant rate by the current through the resistors 322 and 324. This current flows for reasons described previously. The anode of the triode 340 will continue to fall negatively at a linear rate as the capacitor 341 charges and until the triode reaches saturation.

The triodes 374, 384 and 388 will operate in response to the drop in anode voltage of the triode 340 to cause the driving voltage at the anode of the triode 388 for the clockwise pulse generator formed by the triodes 436 and 438 to rise gradually and approach the value of the positive terminal of the source 210. At the same time, the driving voltage at the anode of the triode 388 for the counterclockwise generator formed by the triodes 476 and 478 will decrease until it is limited at ground potential by the diode 402. The voltage from the anode of the driver tube 384 activates the clockwise pulse generator circuit of the triodes 436 and 448 to drive the servomotor 40 in a clockwise direction, and the voltage from the anode of the driver tube 388 holds the counterclockwise pulse generator of the triodes 476 and 478 completely cut off. During this time, the triodes 408 and 410 produce a negative voltage on the lead 362 and a positive voltage on the lead 426.

Now if the voltage at the input terminal 306 is reversed, the first effect is a current flow through the resistors 322 and 324 to produce an opposite charge on the capacitor 341 as the anode of the triode 340 continues to hold the control grid of the triode 326 at about +1.6 volts and the diode 354 holds the left end of the resistor 322 at −5 volts aided by the negative feedback voltage on the lead 362. This places 6.6 volts across the resistors 322 and 324 in a direction for reversing the flow of current through the resistances and the capacitance 341 from the direction previously obtained. This current initially tends to discharge the charge previously produced in the capacitance 341 and then to charge the capacitance in the opposite direction. Because of the production of 6.6 volts across the resistances 322 and 324, the current flowing through the capacitance 341 is relatively high such as the rise in voltage on the anode of the triode 340 and the resulting deceleration of the servomotor 40 to the quiescent point are nearly twice as fast as the acceleration away from it. As the quiescent point is passed, the negative feedback voltage polarity on the lead 362 is immediately reversed due to the action of the triodes 408 and 410. This causes the charging current for the capacitor 341 to be reduced so as to obtain a decreased acceleration rate.

Now, as the input signal at the terminal 306 continues negative, the operation proceeds with the signals reversed to make the anode of the driver triode 388 positive to actuate the counterclockwise generator of the triodes 476 and 478. If the input voltages at the input terminal 304 is again reversed, the counterclockwise pulse generator voltage will decrease along a fast deceleration curve.

When the input signal at the terminal 304 is returned to zero rather than changed to the opposite polarity, the fast deceleration rate is retained because of negative feedback on the lead 362. This feedback maintains a voltage across the resistors 322 and 324 of opposite polarity and of high amplitude relative to that previously obtained so as to supply the rapid charge current to the capacitor 341 in a direction for reducing the charge essentially to zero. In this way, the triodes 340 and 374 are enabled to return quickly to their balanced condition.

The variation between the rate of acceleration and that of deceleration as described above provides damping for the servo system. The need for this damping can best be illustrated by first assuming that the accelerations and decelerations in the system are equal. If the operator should suddenly move the stylus 110 in FIGURE 5 by a slight amount and then hold it so that it cannot move across the top of the recording table, the entire system would operate to cause the servomotors to accelerate and run until the stylus assembly is moved directly over the stylus point position and a null is reached. However, the integrating network would be at its furthest excursion and the servomotors would still be running. As the null point is passed, deceleration would begin. When the servomotors finally stop, the stylus assembly would have reached a point as far beyond the stylus point as it was from it in the beginning. Oscillations between these two points would then continue indefinitely.

When the deceleration is made faster than the acceleration as in the present application in the manner described above, the pencil holder will overshoot the pencil point position by a smaller distance since the servomotors are stopped faster. Oscillations will still occur, but the amplitude of each overshoot is lessened so that these oscillations will stop after a few cycles.

The triodes 436 and 448 and their associated circuitry form, as noted above, the clockwise recording pulse generator. In the quiescent state, the driver voltage for this generator is below a selected threshold, such as 30 volts. The triode 448 is now fully conductive because current through the resistor 450 drives the grid of the triode 448 toward the positive voltage of the source 210. Grid current limits this positive voltage to that of the cathode. Current through the cathode resistors 454 and 456 causes a voltage drop which places the cathodes at a positive voltage of, for example, 37 volts. Current through the anode resistor 452 places the anode of the triode 448 at a positive voltage of about 140 volts.

The triode 436 is now non-conductive since the triode has its anode held at about 125 volts by the divider action of the resistors 442 and 444. This follows because the cathode of the triode 436 is held at 37 volts positive by the cathode of the triode 448, and because its grid is held at a less positive value (of the order of 30 volts) by the anode of the triode 384.

The voltage drop across the resistor 466 provides a bias current of about 4½ milliamperes for the recording head 60. Although the resistor 464 and the diode 462 are in parallel with the recording head 60, their resistance is much greater than that of the recording head and they do not have any appreciable effect on the current through the head.

When the input voltage from the anode of the triode 384 increases in the positive direction, the pulse generator 436, 438 begins to operate. This results from the fact that the capacitor 440 becomes charged by current flowing through the resistor 432 and the resistor 434 as a result of the positive increase in voltage from the anode of the triode 384. Since the capacitance 440 must become charged before the pulse generator can be activated to produce an output pulse, the initial activation of the triode 384 causes the pulse generator to be gradually activated. The pulse generator also becomes gradually activated because of the control exerted over the operation of the triode 384 by the integrator including the triodes 326 and 330. This provides slow and smooth starting for the controlled servomotor, despite abrupt initial movements of the pivotable stylus 110.

After the capacitor 440 has become sufficiently charged to a potential such as 30 volts, the tube 436 becomes conductive.

The resulting current flow through the anode resistor 442 causes the anode of the triode 436 to swing in a negative direction and this drives the control grid of the triode 448 negative through the capacitor 446. This reduces the current through the triode 448 causing the cathode of this triode and the cathode of the triode 436 to decrease. This decrease in voltage on the cathode of the triode 448 and 436 causes the current through the triode 436 to increase because of the increased positive difference in voltage between the grid and cathode of the triode 436. This positive feedback effect continues until the triode 436 is fully conductive and the triode 448 is non-conductive. At such a time, the cathodes of the triodes 436 and 448 have a relatively low potential such as approximately +4 volts.

As the cathode voltages of the triodes 436 and 448 drop, the control grid of the triode 436 is driven positive with respect to its cathode. The resulting flow of grid current acts to discharge the capacitor 440 by a flow of current between the grid and cathode of the triode.

After the capacitance 440 has become discharged to the relatively low potential of +4 volts produced on the cathodes of the diodes 436 and 448, the signal produced on the anode of the triode 384 acts to produce a charge across the capacitance. When the voltage produced on the anode of the triode 384 is sufficiently low to cause the potential across the diode 438 to have a value less than approximately 20 volts, the back impedance of the diode is relatively high. This causes the charging current to flow through a circuit including the resistance 434 and the capacitance 440. Because of the inclusion of the resistance 434 in the charging circuit, the capacitance 440 becomes charged at a relatively slow rate.

The diode 438 is provided with characteristics such that a leakage current flows from the cathode to the anode of the diode for voltages greater than 26 volts between these elements. This leakage current is instrumental in placing a relatively low resistance across the resistor 434 so as to effectively by-pass the resistance. By by-passing the resistance 434, the capacitance 440 becomes charged at a relatively rapid rate. This rate becomes increased with increased voltages from the anode of the triode 384 since progressive decreases are produced in the back impedance of the diode 438. In this way, the diode 438 provides a control over the rate of pulse production by the pulse generator in accordance with the amplitude of the voltage introduced to the generator.

As the triode 448 becomes non-conductive, its anode voltage tries to rise. However, since the anode is coupled through the capacitor 460 and through the resistor 464 to the recording head 60 and to the resistor 466, a relatively high current now passes through the capacitor 460 and through the resistor 464. A portion of this current flows through the resistor 466 and the remaining portion flows through the recording head 60 in a direction opposite to that of the bias current. Whenever this occurs, the magnetic tape is magnetized in a transverse strip with a polarity opposite to that produced by the bias current.

After a time interval of the order of 400 microseconds, the capacitor 446 becomes sufficiently charged by current drawn through the capacitor and the resistors 450 and 444 and the triode 436 to allow the triode 448 to begin drawing some plate current. The resultant current through the cathode resistors 454 and 456 causes the cathodes to become slightly more positive, and since the capacitor 440 now holds the control grid of the triode 436 for an instant at a relatively constant voltage of low magnitude, the current through the troide 436 is reduced. This current reduction drives the plate of the triode 436 positive and drives the grid of the triode 448 positive through the capacitor 446 until the triode 448 is again fully conductive and the triode 436 is returned to its non-conductive state. During this cycle, therefore, a pulse of current is produced in the recording head 60. The duration of the pulse is controlled in large part by the value of the capacitor 446 and the resistor 450.

The small charge acquired by the capacitor 460 during the 400 microsecond pulse period is now discharged through the diode 462. Current through the recording head 60 is now again reversed and returned to its bias value. During the pulse period, the recording head 60 recorded a pulse on the magnetic tape 62 of FIGURE 1 as noted above, and a portion of the negative going pulse appearing on the cathodes was fed to the capacitor 458 as a follow pulse to drive the servomotor 40 and move the stylus assembly so as to keep the operator oriented.

So long as the voltage from the anode of the triode 384 is held above the threshold value of, for example, 30 volts, the pulse generator continues to oscillate in the manner described. This causes a series of recording pulses to flow through the head 60 and a corresponding series of pulses to be supplied to the servomotor 40.

As the voltage introduced to the pulse generator is increased, the capacitor 440 charges at a faster rate and the time between the pulses is reduced. Therefore, the frequency of the output pulses increases, as does the speed of the controlled servomotor.

Therefore, whenever the troide 384 is controlled so that its plate voltage rises above a selected threshold, the pulse generator of the triodes 436 and 448 is set into action, and this generator continues to generate pulses so long as that voltage remains above the threshold. As noted directly above, the repetition frequency of the pulses from the generator increases to provide increased speed of the servo system as the voltage is progressively increased over the threshold. Whenever the voltage from the triode 384 drops to the threshold, the activation of the pulse generator is terminated.

The counterclockwise pulse generator of the triodes 476 and 478, and the circuitry associated with these triodes operates in exactly the same way under the control of the anode voltage from the triode 388. This latter pulse generator causes the recording head 64 to record the output pulses in a different channel on the magnetic tape 62 (FIGURE 1), and it also causes the capacitor 485 to supply counterclockwise control pulses to the servomotor 40.

The maximum servomotor speed is set by adjusting the potentiometers 428 and 468. These potentiometers limit the voltages fed to the pulse generators. The potentiometers 428, 468 and 322 are mechanically coupled for unicontrol, and they are adjusted by a knob control. This latter control may be conveniently equipped with a pointer and indicating speed control dial. The value of the potentiometer 322 is reduced as the maximum servomotor speeds are reduced so that the acceleration to any maximum speed will be as fast as the system can tolerate. The potentiometers 430 and 470 may be screwdriver adjustments for calibration of the servomotor speed to the speed control dial.

The invention provides, therefore, an improved and eminently simple control for recording data on a magnetic tape or similar recording medium. The particular data recorded is related to the control of a servo type of mechanism, and the system is particularly adapted to such a control.

The system of the invention is so constituted that the servo systems are controlled in an improved manner. As described above, the acceleration of each servo system towards any selected position is made less than the deceleration. This provides the required damping effect in the system. Also, the system is constituted so that a rapid and efficient control of the servo system, in addition to smooth starts, may be realized. This latter feature is achieved by causing the repetition frequency of the pulse generators to be slowly initiated as the control effect on the stylus assembly begins and to increase as the control effect is increased. This causes the system to start smoothly and to operate at a rate which is a function of the distance of the pivotal adjustment of the stylus 110 from the null point. Also, the system is so constituted that the speed with which the servo systems respond is substantially proportional to the pivotal pressure applied to the stylus.

As described in the preceding paragraphs, the recording system may take the form of a stylus movable over the top surface of a recording table. Such movement of the stylus may be made over a lay-out that had been previously drafted on the table top. The lay-out itself may be to an actual size scale, alternately it can be "blown up" and the system adjusted to provide a selected submultiple control effect with respect to the actual movements of the stylus.

When so desired, the stylus can be moved in accordance with any pre-conceived pattern across the top of the operating table by the manipulation of potentiometers in the manner described. Moreover, the work table of the controlled machine tool itself can be so controlled while the recording is being made. The latter technique is the equivalent of the manual control of the work table of the machine tool while the desired operations are being made on the first workpiece. The system is then capable of taking over and automatically repeating the desired operational pattern on each of a plurality of successive workpieces.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. Apparatus for recording data on a recording medium to control the movements of an output member, including, a member movable in accordance with variations in the desired positioning of the output member, means including a first differential transformer for converting movements of the member along a first axis into a first signal having a phase related to the direction of movement of the member along the axis and having an amplitude related to the displacement of the member along the axis, means including a second differential transformer for converting movements of the member along a second axis transverse to the first axis into a second signal having a phase related to the direction of movement of the member along the axis and having an amplitude related to the displacement of the member along the axis, means including first electrical pulse producing circuitry coupled to the first differential transformer and responsive to the phase and amplitude of the first signal to produce first pulses representing a first phase in the first signal and occurring at a repetition rate related to the amplitude of the first signal and including second pulse producing circuitry to produce second pulses representing the opposite phase in the first signal and occurring at a repetition rate related to the amplitude of the first signal, means including third electrical pulse producing circuitry coupled to the second differential transformer and responsive to the phase and amplitude of the second signal to produce third pulses representing a first phase in the second signal and occurring at a repetition rate related to the amplitude of the second signal and including fourth pulse producing circuitry to produce fourth pulses representing the opposite phase in the second signal and occurring at a repetition rate related to the amplitude of the second signal, first recording means responsive to the first and second pulses to obtain a recording on the recording medium of information representing the occurrence of such pulses, second recording means responsive to the third and fourth pulses to obtain a recording on the recording medium of information representing the occurrence of such pulses, said first recording means including a first recording head for recording in a first channel on the recording medium the occurrence of said first pulses and a second recording head for recording in a second channel on the recording medium the occurrence of said second pulses, said second recording means including a third recording head for recording in a third channel on the recording medium the occurrence of said third pulses and a fourth recording head for recording in a fourth channel on said recording medium the occurrence of said fourth pulses.

2. Apparatus for tracing a pattern comprising: a member movable in accordance with the contour of a pattern, holder means in which said member is movably mounted, holding means for holding a pattern in operable relation to said movable member, means including first electric circuitry responsive to movement of said member in a first direction along a first axis of said pattern holding means to produce first pulses, the number of which bears a given first proportion to the magnitude of such movement of said member, and responsive to movement of the member in an opposite direction along said first axis to produce second pulses, the number of which bears said given first proportion to the magnitude of said last mentioned movement, means including second electrical circuitry responsive to movement of said member in a first direction along a second axis transverse to said first axis to produce third pulses, the number of which bears a given second proportion to the magnitude of said last-mentioned movement, and responsive to movement of said member in an opposite direction along said second axis to produce fourth pulses, the number of which bears said given second proportion to the magnitude of said last mentioned movement, means including servo means responsive to said first and second pulses for producing relative movement between said holder means and said pattern holding means in first and opposite directions along said first axis in accordance with occurrence of said first and second pulses, and means including servo means responsive to said third and fourth pulses for producing relative movement between said holder means and said pattern holding means in first and opposite directions along said second axis in accordance with occurrence of said third and fourth pulses.

3. Apparatus for tracing a pattern to control the movements of an output member, including, a control member movable in accordance with variations in the desired positioning of the output member, means including first electrical circuitry responsive to movements of the control member along a first axis for producing a first signal having characteristics representing the rate and direction of movement of the member along the axis, means including second electrical circuitry responsive to movements of the member along a second axis transverse to the first axis for producing a second signal having characteristics representing the rate and direction of movements of the member along the axis, means including first pulse producing electrical circuitry coupled to the first electrical circuitry for producing first pulses only upon the occurrence of a first signal having characteristics above a particular level to eliminate undesired movements of the member along the first axis, said producing of first pulses being at a repetition rate related to the characteristics of the first signal above the particular level, means including second pulse producing electrical circuitry coupled to the second electrical circuitry for producing second pulses only upon the occurrence of a second signal having characteristics above a particular level to eliminate undesired movements of the member along the second axis, said producing of second pulses being at a repetition rate related to the characteristics of the second signal above said last mentioned particular level.

4. Apparatus for tracing a pattern to control the movements of an output member, including, a member movable in accordance with variations in the desired positioning of the output member, holder means to which said member is movably mounted, pattern holding means for holding a pattern to be traced in operative relation to said member, means coupled to the movable member and including first electrical circuitry for producing control signals having characteristics related to the movement of the member, means including feedback means coupled to the first electrical circuitry and responsive to the characteristics of the first signals to produce feedback signals having characteristics opposing the characteristics of the first signals during accelerating movements of the movable member and having characteristics aiding the characteristics of the first signals during decelerating movement of the movable member, and servo means coupled electrically to the first electrical circuitry and the feedback means and responsive to the control and feedback signals to effect relative movement between said holder means and said pattern holding means in accordance with the combined characteristics of the control and feedback signals.

5. Apparatus for recording data on a recording medium to control the movements of an output member, including, a member movable in accordance with variations in the desired positioning of the output member, means including first differential magnetic means coupled to the member for producing first signals having an amplitude and phase related to the movements of the member along a first axis, means responsive to the signals from the first differential magnetic means and coupled magnetically thereto for opposing the movement of the member along the first axis to provide a control for facilitating desired movements of the member along that axis, means including second differential magnetic means coupled to the member for producing second signals having an amplitude and phase related to the movements of the member along a second axis transverse to the first axis, means responsive to the signals from the second differential magnetic means and coupled magnetically thereto for opposing the movement of the member along the second axis to provide a control for facilitating desired movements of the member along that axis, means responsive to the signals from the first differential magnetic means for producing first pulses at a repetition rate related to the amplitude of the first signals, means responsive to the signals from the second differential magnetic means for producing second pulses at a repetition rate related to the amplitude of the second signals, and means responsive to the first and second pulses for recording on the recording medium the occurrence of such pulses.

6. Apparatus as set forth in claim 5, including a holder, said movable member being a stylus movably mounted in said holder and also including pattern holding means for holding a pattern in operable relation to said stylus, and further including: first servo means coupled electrically to said first pulse means and coupled mechanically to said holder means and said pattern holding means to control relative movement between said holder means and said pattern holding means along said first axis in accordance with occurrence of said first pulses, and second servo means coupled electrically to said second pulse means and coupled mechanically to said holder means and said pattern holding means to control relative movement between said holder means and said pattern holding means along said second axis in accordance with occurrence of said second pulses.

7. Apparatus for recording data on a recording medium to control the movements of an output member, including, a member movable over a marking member in accordance with variations in the desired positioning of the output member, means coupled to the movable member and including first electrical circuitry for producing first control signals having an amplitude and phase related to the rate and direction of movement of the member along a first axis, means coupled to the movable member and including second electrical circuitry for producing second control signals having an amplitude and phase related to the rate and direciton of movement of the movable member along a second axis transverse to the first axis, means coupled to the movable member and including second electrical circuitry for producing second control signals having an amplitude and phase related to the rate and direction of movement of the movable member along a second axis transverse to the first axis, means movable relative to the recording medium to produce markings on the recording medium in accordance with such relative movement, means including third electrical circuitry coupled to the first electrical circuitry and responsive to the first control signals to produce first feedback signals having phase and amplitude characteristics opposing the phase and amplitude characteristics of the first control signals during movements of the movable members along the first axis toward a desired position and aiding the phase and amplitude characteristics during movement of the movable member along the first axis past the desired position, means including fourth electrical circuitry coupled to the second electrical circuitry and responsive to the second control signals to produce second feedback signals having phase and amplitude characteristics opposing the phase and amplitude characteristics of the second control signals during movements of the movable member along the second axis toward the desired position and aiding the phase and amplitude characteristics during movements of the movable member along the second axis past the desired position, first servo means coupled to the first control and feedback means for producing a relative movement between the movable member and the marking member along the first axis in accordance with the composite characteristics of the first control and feedback signals, and second servo means coupled to the second control and feedback means for producing a relative movement between the movable member and the marking member along the second axis in accordance with the composite characteristics of the second control and feedback signals.

8. Apparatus for recording data on a recording medium to control the movements of an output member, including, a member movable in accordance with variations in the positioning of the output member, means coupled to the movable member and including electrical circuitry for producing first signals having a phase dependent upon the movement of the member in a first direction or in an opposite direction along a first axis and having an amplitude related to the rate of such movement, means coupled to the movable member and including second electrical circuitry for producing second signals having a phase dependent upon the movement of the member in a first direction or in an opposite direction along a second axis transverse to the first axis and having an amplitude related to the rate of such movement, means including third electrical circuitry coupled to the first electrical circuitry and responsive to the first signals to produce third signals having characteristics compensating for unintentional displacements of relatively small magnitudes in the movable member along the first axis and compensating for abrupt movements of the movable member along the first axis, means including fourth electrical circuitry coupled to the second electrical circuitry and responsive to the first signals to produce fourth signals having characteristics compensating for unintentional displacements of relatively small magnitude in the movable member along the second axis and compensating for abrupt movements of the movable member along the second axis, means coupled to the third electrical circuitry for recording on the medium in accordance with the characteristics of the third electrical signals, and means coupled to the fourth electrical circuitry for recording on the medium in accordance with the characteristics of the fourth electrical signals.

9. Apparatus for recording data on a recording medium to control the movements of an output member, including, a member movable in accordance with variations in the desired positioning of the output member, means coupled to the movable member and including first electrical circuitry responsive to movements of the member for producing first signals having an amplitude and phase related to the rate and direction of movement of the movable member along a first axis, means coupled to the movable member and including second electrical circuitry responsive to movements of the movable member for producing second signals having an amplitude and phase related to the rate and direction of movement of the movable member along a second axis transverse to the first axis, means movable relative to the recording medium for producing markings on the medium in accordance with such movements, first control means including a first integrator for inhibiting production of the first signals for variations in the displacement of the movable member below a particular level and including electrical stages connected in a feedback relationship to the integrator to oppose displacements of said movable member along the first axis approaching a desired displacement and to provide a damping action on any such displacements beyond the desired displacement, second control means including a second integrator for inhibiting production of the second signals for variations in the displacement of the movable member below a particular level and including electrical stages connected in a feedback relationship to the integrator to oppose displacements of said movable member along the second axis approaching the desired displacement and to provide a damping action on any such displacements beyond the desired displacement, and means coupled to the recording means and responsive to the signals from the first and second control means for producing marks on the recording medium in accordance with the signals from the first and second control means.

10. A system for recording data on a recording medium including: a movable member, a servo system including a servomotor for driving said movable member along a selected axis in a direction determined by the rotational direction of said servomotor, manually actuated control means for developing a first alternating current signal having a selected phase for movements of said member in one direction along said axis and for developing a second oppositely phased alternating current signal for movements of said member in the opposite direction along said axis, demodulating means coupled to said control means for developing a positive direct voltage in response to said first alternating current signal and for developing a negative direct voltage in response to said second alternating current signal, first signal generating means for generating a first signal and for imparting clockwise rotational motion to said servomotor, second signal generating means for generating a second signal and for imparting counter-clockwise rotational motion to said servomotor, integrator means responsive to said positive and negative direct voltages from said demodulating means for activating selected ones of said first and second signal generating means as determined by the polarity of said direct voltage, and means for recording said first and second signals from said generating means in independent channels on said recording medium, in which said integrator means includes a feedback network to provide a reduced drive for said first and second signal generating means for increasing positive and negative voltages from said demodulating means as compared with decreasing positive and negative voltages therefrom so as to provide damping for said servo system.

11. A system for recording data on a recording medium including: a movable member, a servo system including a servomotor for driving said movable member along a selected axis in a direction determined by the rotational direction of said servomotor, manually actuated control means for developing a first alternating current signal having a selected phase for movements of said member in one direction along said axis and for developing a second oppositely phased alternating current signal for movements of said member in the opposite direction along said axis, demodulating means coupled to said control means for developing a positive direct voltage in response to said first alternating current signal and for developing a negative direct voltage in response to said second alternating current signal, first signal generating means for generating a first signal and for imparting clockwise rotational motion to said servomotor, second signal generating means for generating a second signal and for imparting counter-clockwise rotational motion to said servomotor, integrator means responsive to said positive and negative direct voltages from said demodulating means for activating selected ones of said first and second signal generating means as determined by the polarity of said direct voltage, and means for recording said first and second signals from said generating means in independent channels on said recording medium, in which said integrator means includes a feedback network to provide a band of zero drive for said first and second generating means as said direct voltage from said demodulating means approaches zero so as to provide a relatively broad stop range for said servomotor.

12. Apparatus for recording data on a recording medium including: a recording table having a recording surface, a stylus assembly movable along said recording surface and including a pivotable stylus to produce markings on the recording surface in accordance with the movements of the stylus assembly, at least one drive mechanism for said stylus assembly, first electro-magnetic means included in said stylus assembly for producing a variable control effect in response to pivotal movements of said stylus, control means coupled to said electro-magnetic means for activating said drive mechanism in response to the variable control effect produced by said first electro-magnetic means, and second electro-magnetic means included in said stylus assembly and coupled to said control means to produce an opposing effect in response to the variable control effect obtained from said first electro-magnetic means for the production of an increased stability in the pivotable movements of said stylus.

13. Apparatus for recording data on a recording medium including: a recording table having a recording surface, a stylus assembly movable along said recording surface and including a pivotable stylus formed at least in part from magnetic material, at least one drive mechanism for said stylus assembly, a first transformer included in said stylus assembly and having a core positioned on one side of said stylus and spaced therefrom for the production of first signals having an amplitude variable in accordance with the pivotable movements of said stylus, a second transformer included in said stylus assembly and differentially connected to said first transformer and having a core positioned on the opposite side of said stylus and spaced therefrom for the production of second signals having an amplitude variable in accordance with the pivotable movements of said stylus, control circuit means coupled to said differentially-connected transformers for activating said drive mechanism in response to differences in the first and second signals from said transformers, a pair of electro-magnetic coil members included in said stylus assembly and having respective cores positioned on opposite sides of said stylus, said coil members being coupled to said transformer means for activation by said transformers to oppose the pivotal movements of said stylus for an increased stability in the movements of said stylus, and means for producing output signals during the intervals of activation of said drive mechanism and in accordance with such activation and for obtaining the recording of information related to such output signals.

References Cited in the file of this patent

UNITED STATES PATENTS

| | | |
|---|---|---|
| 2,484,968 | Sponaugle | Oct. 18, 1949 |
| 2,537,770 | Livingston, et al. | Jan. 9, 1951 |
| 2,619,602 | Walker et al. | Nov. 25, 1952 |
| 2,628,539 | Neergaard | Feb. 17, 1953 |
| 2,698,410 | Madsden et al. | Dec. 28, 1954 |
| 2,704,326 | Whitson et al. | Mar. 15, 1955 |
| 2,705,282 | Parode et al. | Mar. 29, 1955 |
| 2,708,257 | Bedford | May 10, 1955 |

(Other references on following page)

UNITED STATES PATENTS

| | | | |
|---|---|---|---|
| 2,755,160 | Holmes | July 17, | 1956 |
| 2,776,099 | Ferrill | Jan. 1, | 1957 |
| 2,777,354 | Stickney et al. | Jan. 15, | 1957 |
| 2,781,848 | Thomas | Feb. 19, | 1957 |
| 2,836,735 | Kreutzer | May 27, | 1958 |
| 2,837,707 | Stokes | June 3, | 1958 |
| 2,839,351 | Cutler | June 17, | 1958 |
| 2,851,643 | Limberger | Sept. 9, | 1958 |
| 2,866,153 | Rhoades | Dec. 23, | 1958 |
| 2,882,476 | Wetzel | Apr. 14, | 1959 |
| 2,939,287 | Capron et al. | June 7, | 1960 |
| 2,943,906 | Thomas | July 5, | 1960 |

FOREIGN PATENTS

| | | | |
|---|---|---|---|
| 316,491 | Switzerland | Nov. 30, | 1956 |